US009316130B1

(12) United States Patent
Harmon, Sr. et al.

(10) Patent No.: US 9,316,130 B1
(45) Date of Patent: Apr. 19, 2016

(54) HIGH EFFICIENCY STEAM ENGINE, STEAM EXPANDER AND IMPROVED VALVES THEREFOR

(75) Inventors: James V. Harmon, Sr., Mahtomedi, MN (US); Jerry A. Peoples, Harvest, AL (US)

(73) Assignee: Thermal Power Recovery LLC, Mahtomedi, MN (US)

( * ) Notice: Subject to any disclaimer, the term of this patent is extended or adjusted under 35 U.S.C. 154(b) by 783 days.

(21) Appl. No.: 13/532,853

(22) Filed: Jun. 26, 2012

Related U.S. Application Data

(63) Continuation-in-part of application No. 12/959,025, filed on Dec. 2, 2010, now Pat. No. 8,448,440, which is a continuation-in-part of application No. 12/539,987, filed on Aug. 12, 2009, now Pat. No.
(Continued)

(51) Int. Cl.
| F01K 23/06 | (2006.01) |
| F01K 13/00 | (2006.01) |
| F01B 15/02 | (2006.01) |
| F01B 17/04 | (2006.01) |
| F01L 31/00 | (2006.01) |
| F01L 15/02 | (2006.01) |
| F01L 15/14 | (2006.01) |
(Continued)

(52) U.S. Cl.
CPC ............... *F01L 31/00* (2013.01); *F01B 17/04* (2013.01); *F01B 17/02* (2013.01); *F01B 2170/0429* (2013.01); *F01B 2170/0435* (2013.01); *F01B 2170/0441* (2013.01); *F01L 23/00* (2013.01)

(58) Field of Classification Search
CPC .. F01B 17/04; F01B 17/02; F01B 2170/0435; F01B 2170/0429; F01B 2170/0441; F01L 23/00; F01L 31/00; F15B 11/0325; F02B 3/06
USPC ........ 60/670–671, 676, 678, 784, 513; 91/10, 91/50, 152, 156, 160, 163, 196, 207, 217, 91/259, 216 B, 268, 271; 92/144, 165 R, 92/166
See application file for complete search history.

(56) References Cited

U.S. PATENT DOCUMENTS 51,081 A 11/1865 Pike
175,485 A 3/1876 Miracle
(Continued)

FOREIGN PATENT DOCUMENTS

DE 3437151 A1 4/1986
DE 102011114746 A1 * 3/2013 .............. F02B 71/00
(Continued)

*Primary Examiner* — Thai Ba Trieu
(74) *Attorney, Agent, or Firm* — James V. Harmon; Nikolai & Mersereau, P.A.

(57) ABSTRACT

An engine having a Rankine cycle steam expander includes an engine cylinder, a cylinder head and a piston in which clearance is zero together with a negligible amount of compression, such that pressure in the clearance volume is as low as to approximate ambient pressure or condenser pressure existing at the end of a return stroke when the clearance is zero. These provisions for clearance and compression working together simultaneously provide a thermal efficiency which substantially exceeds all prior known Rankine operating cycles and is referred to as "zero clearance with zero compression". The steam admission valve is raised slightly by the piston to establish a zero clearance whereupon a steam assist then moves the steam admission valve determinately and quickly to a fully open position.

24 Claims, 11 Drawing Sheets

Related U.S. Application Data 8,061,140, which is a continuation-in-part of application No. 12/492,773, filed on Jun. 26, 2009, now abandoned, said application No. 12/959,025 is a continuation-in-part of application No. 12/844,607, filed on Jul. 27, 2010, now Pat. No. 8,661,817, and a continuation-in-part of application No. 12/387,113, filed on Apr. 28, 2009, now Pat. No. 8,109,097, and a continuation-in-part of application No. 12/075,042, filed on Mar. 7, 2008, now Pat. No. 7,997,080.

(60) Provisional application No. 60/905,732, filed on Mar. 7, 2007, provisional application No. 61/320,959, filed on Apr. 5, 2010, provisional application No. 61/309,640, filed on Mar. 2, 2010.

(51) Int. Cl.
  F01L 15/16     (2006.01)
  F01B 17/02     (2006.01)
  F01L 23/00     (2006.01)

(56) References Cited

U.S. PATENT DOCUMENTS

| | | | | |
|---|---|---|---|---|
| 465,241 | A | 12/1891 | Cowles | |
| 606,739 | A | 7/1898 | Rothgery | |
| 678,806 | A | 7/1901 | Whitfield | |
| 690,620 | A | 1/1902 | Schneider | |
| 694,547 | A | 3/1902 | Hood | |
| 716,115 | A | 12/1902 | Schneider | |
| 753,647 | A | 3/1904 | Thorson | |
| 832,635 | A | 10/1906 | Svenson | |
| 845,622 | A | 2/1907 | Du Shane | |
| 1,011,516 | A | 12/1911 | Stappen | |
| 1,027,380 | A | 5/1912 | Fryer | |
| 1,128,125 | A | 2/1915 | Fryer | |
| 1,169,672 | A | 1/1916 | Palm | |
| 1,210,649 | A | 1/1917 | Holley | |
| 1,217,788 | A | 2/1917 | Liedtke | |
| 1,324,183 | A | 12/1919 | Still | |
| 1,332,633 | A | 3/1920 | Parrish | |
| 1,359,988 | A | 11/1920 | Hansen | |
| 1,427,395 | A | 8/1922 | Kaschtofsky | |
| 1,502,918 | A | 7/1923 | Scott | |
| 1,489,291 | A | 4/1924 | Tuerk | |
| 1,496,839 | A | 6/1924 | Bohan et al. | |
| 1,517,372 | A | 12/1924 | Martineau | |
| 1,542,578 | A | 6/1925 | Pool | |
| 1,601,995 | A | 10/1926 | Butler et al. | |
| 1,629,677 | A | 5/1927 | Bull | |
| 1,630,841 | A | 5/1927 | Fusch | |
| 1,671,838 | A | 5/1928 | Norberg | |
| 1,732,011 | A | 10/1929 | Gouirand | |
| 1,802,828 | A | 4/1931 | Perrenoud | |
| 1,913,251 | A | 6/1933 | Smith | |
| 1,965,569 | A | 7/1934 | Anderson | |
| 1,987,003 | A | 1/1935 | Dole | |
| 2,000,108 | A | 5/1935 | Tucker | |
| 2,040,453 | A | 5/1936 | Weber | |
| 2,057,075 | A | 10/1936 | Wuehr | |
| 2,058,485 | A | 10/1936 | Miller | |
| 2,063,970 | A | 12/1936 | Young | |
| 2,138,351 | A | 11/1938 | McGonigall | |
| 2,341,348 | A | 3/1940 | Welby | |
| 2,196,979 | A | 4/1940 | Campbell | |
| 2,196,980 | A | 4/1940 | Campbell | |
| 2,269,106 | A | 1/1942 | Hoffman | |
| 2,309,968 | A | 2/1943 | Marburg | |
| 2,402,699 | A | 6/1946 | Williams | |
| 2,560,449 | A | 7/1951 | Kahr et al. | |
| 2,572,652 | A | 10/1951 | Mueller | |
| 2,604,079 | A | 7/1952 | Ray | |
| 2,632,464 | A | 3/1953 | Kerr | |
| 2,649,078 | A | 8/1953 | Kelly | |
| 2,671,434 | A | 3/1954 | Schmiedeskamp | |
| 2,730,996 | A | 1/1956 | Doble | |
| 2,943,608 | A | 7/1960 | Williams | |
| 2,957,462 | A | 10/1960 | Clark | |
| 3,033,181 | A | 5/1962 | Barnes et al. | |
| 3,137,211 | A | 6/1964 | Grinnell, Jr. | |
| 3,200,798 | A | 8/1965 | Mansfield | |
| 3,216,329 | A | 11/1965 | Peterson | |
| 3,279,326 | A | 10/1966 | Harvey | |
| 3,397,619 | A | 8/1968 | Sturtevant | |
| 3,489,162 | A | 1/1970 | Meynell | |
| 3,527,141 | A | 9/1970 | Peoples | |
| 3,603,344 | A | 9/1971 | Stampfli | |
| 3,638,533 | A * | 2/1972 | Sheridan et al. | 91/268 |
| 3,645,169 | A * | 2/1972 | Clark | 91/268 |
| 3,650,295 | A | 3/1972 | Smith | |
| 3,662,553 | A | 5/1972 | Hodgkinson | |
| 3,719,322 | A | 3/1973 | Gifford | |
| 3,759,141 | A | 9/1973 | Zibrun | |
| 3,877,479 | A | 4/1975 | Miyawaki | |
| 3,882,833 | A | 5/1975 | Longstaff | |
| 3,908,686 | A | 9/1975 | Carter et al. | |
| 3,921,404 | A | 11/1975 | Mason | |
| 3,990,238 | A * | 11/1976 | Bailey | F01B 29/12 60/513 |
| 3,995,531 | A | 12/1976 | Zibrun | |
| 4,023,537 | A | 5/1977 | Carter, Sr. et al. | |
| 4,050,357 | A | 9/1977 | Carter, Sr. et al. | |
| 4,079,586 | A | 3/1978 | Kincaid, Jr. | |
| 4,166,410 | A * | 9/1979 | Schlosser | 91/50 |
| 4,168,655 | A | 9/1979 | Kitrilakis | |
| 4,201,058 | A | 5/1980 | Vaughan | |
| 4,300,353 | A | 11/1981 | Ridgway | |
| 4,362,132 | A | 12/1982 | Neuman | |
| 4,377,934 | A | 3/1983 | Marshall | |
| 4,491,057 | A | 1/1985 | Ziegler | |
| 4,509,464 | A | 4/1985 | Hansen | |
| 4,590,766 | A | 5/1986 | Striebich | |
| 4,706,462 | A | 11/1987 | Soltermack | |
| 4,724,800 | A | 2/1988 | Wood | |
| 4,785,631 | A | 11/1988 | Striebich | |
| 4,829,947 | A | 5/1989 | Lequesne | |
| 5,121,607 | A | 6/1992 | George, Jr. | |
| 5,385,211 | A | 1/1995 | Carroll | |
| 5,657,962 | A | 8/1997 | Neron et al. | |
| 6,095,100 | A | 8/2000 | Hughes | |
| 6,220,210 | B1 | 4/2001 | Kobayashi | |
| 6,237,550 | B1 | 5/2001 | Hatano | |
| 6,443,111 | B1 | 9/2002 | LaDow | |
| 6,457,309 | B1 | 10/2002 | Firey | |
| 6,745,794 | B2 | 6/2004 | Gejewski | |
| 6,834,503 | B2 | 12/2004 | Freymann | |
| 6,895,756 | B2 | 5/2005 | Schmotolocha | |
| RE38,750 | E | 7/2005 | Weaver | |
| 7,056,251 | B2 | 6/2006 | Ibaraki | |
| 7,104,063 | B2 | 9/2006 | Clemens | |
| 7,267,113 | B2 | 9/2007 | Tsuge et al. | |
| 7,841,309 | B2 | 11/2010 | Grundl | |
| 7,856,822 | B2 | 12/2010 | Schoell | |
| 7,992,386 | B2 | 8/2011 | Schoell | |
| 7,997,080 | B2 | 8/2011 | Harmon, Sr. | |
| 8,061,140 | B2 | 11/2011 | Harmon, Sr. | |
| 8,109,097 | B2 | 2/2012 | Harmon, Sr. | |
| 8,807,012 | B1 * | 8/2014 | Bennett et al. | 91/270 |
| 2003/0226603 | A1 | 12/2003 | Gajewski | |
| 2005/0263189 | A1 | 12/2005 | Nakamura | |
| 2010/0043896 | A1 | 2/2010 | Shock et al. | |
| 2010/0058751 | A1 | 3/2010 | Chavez | |
| 2010/0095662 | A1 | 4/2010 | Chavez | |
| 2010/0300100 | A1 | 12/2010 | Harmon, Sr. | |
| 2011/0083434 | A1 | 4/2011 | Peoples | |
| 2012/0192561 | A1 | 8/2012 | Coates | |
| 2012/0324889 | A1 * | 12/2012 | Petitjean et al. | 60/645 |

FOREIGN PATENT DOCUMENTS

| | | | |
|---|---|---|---|
| GB | 25356 | 0/1911 | |
| GB | 28472 | 0/1913 | |
| GB | 125395 | 4/1919 | |

(56) References Cited

FOREIGN PATENT DOCUMENTS

| GB | 130621 | 8/1919 |
| GB | 1750 | 1/2012 |
| JP | 06159061 A * | 6/1994 | ............. F02B 19/02 |
| WO | WO 0231319 | 4/2002 |
| WO | WO 03050402 | 6/2003 |

* cited by examiner

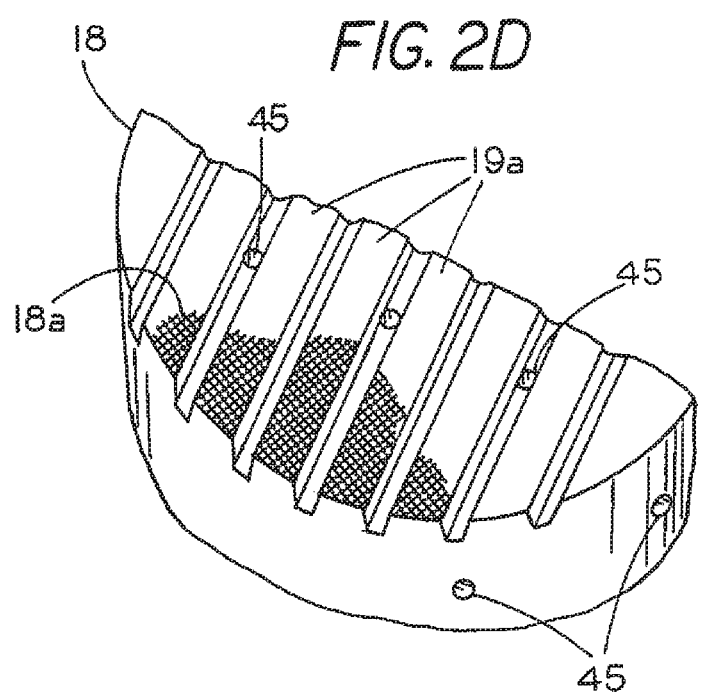

HIGH EFFICIENCY STEAM ENGINE, STEAM EXPANDER AND IMPROVED VALVES THEREFOR

CROSS REFERENCE TO RELATED APPLICATIONS

The present application is a continuation-in-part of application Ser. No. 12/959,025, filed Dec. 2, 2010, which in turn is a continuation-in-part of application Ser. No. 12/539,987, filed Aug. 12, 2009, which in turn is a continuation-in-part of application Ser. No. 12/492,773, filed Jun. 26, 2009 (now abandoned), a continuation-in-part of copending application Ser. No. 12/844,607, filed Jul. 27, 2010, a continuation-in-part of Ser. No. 12/387,113, filed Apr. 28, 2009 and Ser. No. 12/075,042, filed Mar. 7, 2008.

The applicants also the benefit of the following provisional applications: 61/309,640, filed Mar. 2, 2010; and 61/320,959, filed Apr. 5, 2010; and 60/905,732, filed Mar. 7, 2007, all of which are incorporated herein by reference.

BACKGROUND OF THE INVENTION

1. Field of the Invention

This invention relates to steam engines as well as steam expanders that can be used as a part of a dual cycle engine for recovering waste heat, and especially to a method and apparatus for achieving higher efficiency in such engines and expanders.

2. Background of the Invention

Although steam engines can use a variety of liquid and lower cost solid fuels and inherently produce few toxic emissions, the thermal efficiency of current steam engines is significantly below that of internal combustion engines.

To achieve greater efficiency, our prior pending application Ser. No. 12/959,025, filed Dec. 2, 2010, provides a new Rankine operating cycle which can be referred to as a "zero clearance with zero compression" cycle or a Z-Z cycle in which the clearance can approach zero but provision must be made to keep the piston from hitting the head. Consequently, a near zero or quasi-zero clearance was used. While minimal compression is typically provided in both the present and the prior application, for various reasons some compression may be present during the last fraction of an inch before TDC due, for example, to the dimensions of the valves and parts used to operate valves.

U.S. Pat. No. 4,168,655 describes an engine with an automatic inlet valve in which the force used to close valve is overcome by knocking it ballistically off its seat, thus producing a high impact stresses in the valve and piston. In addition to eliminating high impact stress of U.S. Pat. No. 4,168,655, the piston of the present invention can be connected directly to a wrist pin without the need for external valving that adds substantially to the clearance volume. The prior patent also employs steam recompression which makes zero compression with zero clearance operation impossible, and routine variations in speed and pressure are able to interfere with repeatable cutoff control. It is also current practice as in U.S. Pat. Nos. 7,856,822 and 7,992,386 to admit steam through inlet passages or ports that extend out of the cylinder and therefore create a substantial clearance volume.

One major objective of the present invention is to find a way to provide a steam admission method and apparatus that concurrently provides inlet valve actuation with no clearance or almost no clearance between the piston and the end of the cylinder as well as eliminating connecting ducts or ports while simultaneously creating little, if any, compression in the cylinder between the piston and cylinder head at the end of the exhaust stroke such that the clearance is actually zero or approximates zero and, in this way, provide an engine constructed and operated such that the actual operating characteristics achieve maximum thermal efficiency in accordance with the zero clearance with zero compression operating cycle described herein and in our foregoing application Ser. No. 12/959,025 wherein indicated thermal efficiency which is better than that of the best prior operating cycle known, is given by the formula $$\eta_{zz} = \text{Cycle Efficiency} = \frac{Work_{NET}}{m\Delta h} = \frac{P_T}{\rho_s x \Delta h}\left[\frac{xn - x^n}{n-1} - \frac{P_A}{P_T}\right]$$

with terms defined as follows:

$\eta_{ZZ}$—Thermal efficiency of zero clearance zero compression cycle
$\rho_S$—density of supply steam
$P_T$—throttle pressure
$P_A$—condenser pressure
x—cutoff=$V_O/V_R$
$\Delta h$—enthalpy change in steam generator
n—polytropic exponent of expansion, e.g. 1.2
m—steam mass at cutoff
$V_O$—cylinder volume at cutoff
$V_R$—cylinder volume at release

OBJECTS AND ADVANTAGES OF THE INVENTION

In view of these and other shortcomings of the prior art, it is one general object of the invention to provide a new Rankine (steam) operating cycle that makes possible a marked improvement in overall operating efficiency for a steam engine or expander.

Another object is to provide virtually no compression and at the same time provide and utilize a zero clearance between the end of the cylinder and the piston at the end of the exhaust stroke for improving thermal efficiency of a Rankine cycle.

Another object is to provide a steam engine expander for efficiently recovering waste heat energy from an internal combustion engine which typically wastes about two-thirds to three-fourths of the heat in the fuel that is consumed, thereby providing the prospect of an enormous saving in U.S. fuel imports which amount to 9.667 million barrels per day (2009).

A more specific object is to provide a new steam operating cycle for a steam engine or steam expander that is substantially more efficient than the most efficient known prior steam cycle.

Yet another object of this invention is to provide a way to construct an engine that is effective in accurately timing the actuation of steam intake and exhaust from a steam expansion chamber constructed with virtually no connecting ducts or ports that contribute to the clearance volume.

Another object is to find a way to exhaust substantially all of the steam from a minute clearance space while at virtually the same instant admitting a fresh charge without impacting thermal efficiency from an engineering viewpoint as a result of losing admission mass directly to the exhaust outlet.

It is also an object to provide a valve, especially an automatic valve operating without an eccentric, camshaft or cam that eliminates counter-torque due to premature steam admission as the piston approaches dead center yet enables steam to enter efficiently after the dead center position is reached.

Another object is to provide an automatic steam inlet valve with simple ways of setting or varying the cutoff of steam into the steam expansion chamber during each power stroke while the engine is in operation.

Yet another object is to provide an inlet valve that shuts abruptly with a snap action but is relatively easy to open with little impact stress and in which the opening force required is independent of the pressure of steam being admitted.

An additional object is to provide steam power to assist in opening the inlet valve and holding it open for a predetermined fraction of each power stroke.

Yet another object is to employ the invention in a heat recovery expander of an internal combustion engine as well as in a more efficient double expansion steam engine.

These and other more detailed and specific objects and advantages of the present invention will be better understood by reference to the following figures and detailed description which illustrate by way of example but a few of the various forms of the invention within the scope of the appended claims.

BRIEF DESCRIPTION OF THE DRAWINGS

FIG. 2D is a partial perspective view from below of the lower surface of the cylinder head of FIG. 2 with the valve body removed.

SUMMARY OF THE INVENTION

Figure 1:
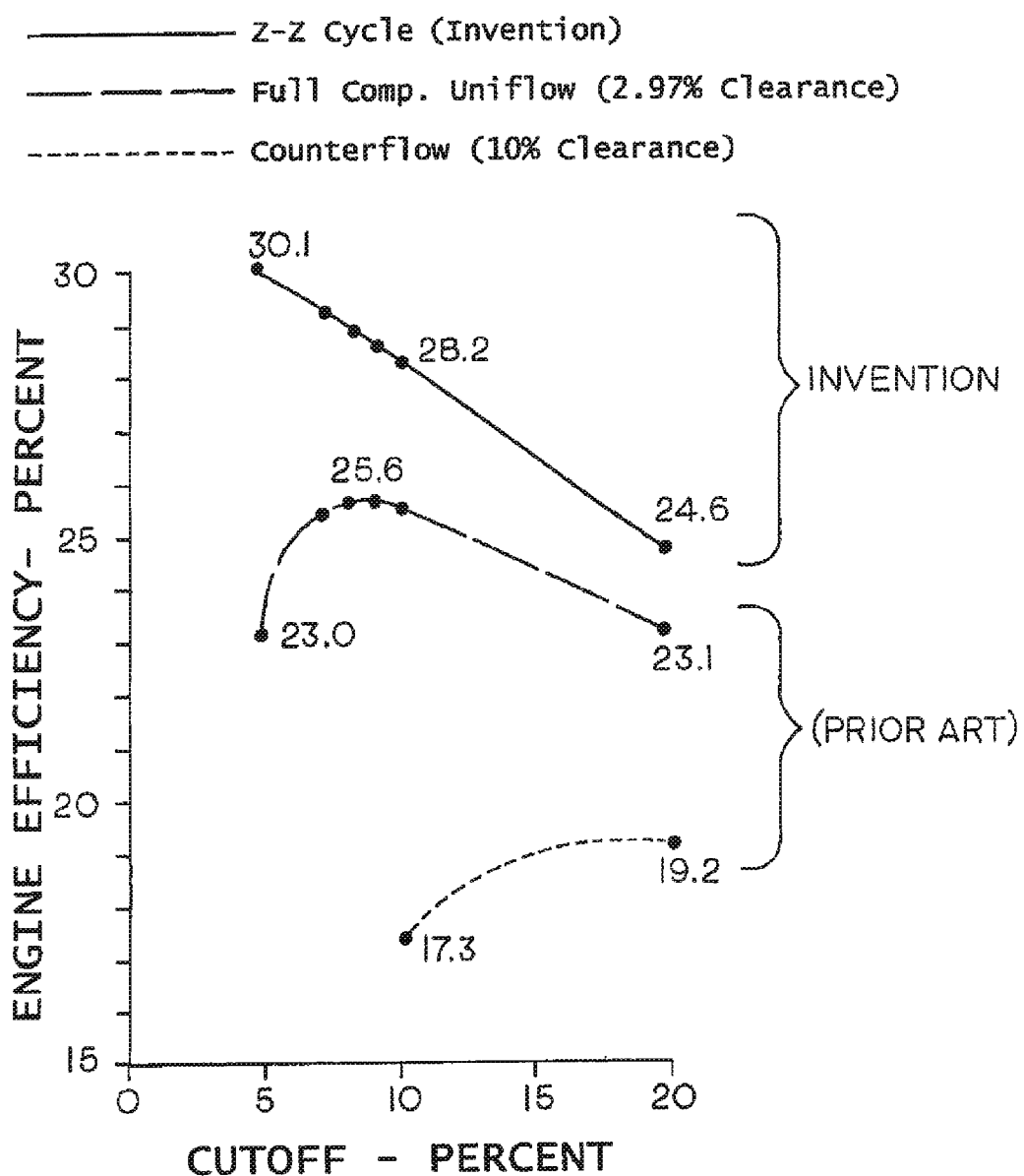
FIG. 1 is a graphic comparison of the indicated thermal efficiency performance of a counterflow engine, a high compression uniflow engine and the present invention.

In spite of the superior exhaust emission characteristics of the Rankine cycle compared to an internal combustion cycle and its ability to use a variety of low grade fuels including organic waste and biomass, steam engines have not been competitive with internal combustion from a thermal efficiency standpoint. In response to this and other shortcomings, the present invention provides a method and apparatus for achieving remarkably improved thermal efficiency in a steam engine or steam expander. One important aspect of the invention results from discovery of a major advance that can be achieved by providing a piston clearance that is actually zero or approximates zero together with a negligible amount of compression, such that pressure in the clearance volume can be as low as to approximate ambient pressure or condenser pressure as the case may be at the end of the return stroke when the clearance is actually zero or is sufficient to prevent contact considering permissible tolerances and thermal expansion. These two provisions for clearance and compression working together simultaneously provide a method and apparatus which constitute a new engine apparatus and Rankine operating cycle that can be referred to as "zero clearance with zero compression". In contrast to U.S. Pat. No. 4,168,655, the present invention provides a way to operate a steam admission valve assembly with low impact stress independent of steam pressure as well as a way to open the inlet valve determinately and quickly yet with greatly reduced piston impact. Applicants' inlet valve can also be opened either automatically responsive to piston contact or by means of a cam shaft and cam or electrically by means of a solenoid to produce an intermittent magnetic field for operating one or more valves with further efficiency. A biphasic exhaust system is also described in which a piston operated automatic valve opens to exhaust steam in a primary phase, and in a later secondary phase a supplemental, normally open exhaust valve permits virtually all residual steam to be exhausted through the approximate end of the piston return stroke after which it is closed by the piston or by the cam and finally held closed during the power stroke by a fresh charge of steam injected into the clearance volume through the steam admission valve. In some embodiments, the automatic valve is eliminated and only the supplemental valve is used.

The invention can employ any of various known working fluids in place of water such as hydrocarbons, monohydric alcohols, refrigerants, halogenated hydrocarbons and the like. The term "steam" is therefore used broadly herein with reference to working fluid or components such as "steam" valves to include these and other fluids as well as water substance held under supercritical conditions of heat and pressure to prevent vaporization. In the present invention, water substance under supercritical conditions can be pumped, passed through valves, etc. and will vaporize explosively when released.

DETAILED DESCRIPTION OF THE PREFERRED EMBODIMENTS

One important aspect of the present invention results from the discovery that a major advance can be achieved by providing a piston with a wristpin coupled to a connecting rod and crankshaft that has either a zero piston clearance or a piston clearance that approximates zero together with little, if any, compression of steam that remains during the terminal part of the exhaust stroke such that the clearance volume disappears as the steam inlet valve opens with either no steam present or a minor amount at a pressure as low as ambient pressure at the point in the cycle when the clearance is either zero or close to zero thereby enabling the entire emerging clearance volume to assume the pressure of the supply steam as the inlet valve begins to open so that virtually all of the potential energy of the incoming steam is utilized in performing expansion work rather than filling an empty space with little or no work output. In this way, the invention provides the capacity for greater thermal efficiency than prior cycles as will be further described with reference to FIG. 1.

It was recognized by Watt that the admission of steam must be cut off early in the power stroke to enhance engine efficiency by enabling expansion work to be performed after the admission valve closes. Consequently, the ability to achieve good efficiency when an early cutoff is provided is especially important, and the present invention is surprisingly far more efficient than prior cycles when an early cutoff is used. In FIG. 1, the indicated thermal efficiency of each engine type is calculated for various cutoff values between about 5% and 20% of the power stroke utilizing well known thermodynamic relationships assuming steam at 1000° F. and 1000 psi as also described in applicant's prior application of Dec. 2, 2010, Ser. No. 12/959,025, which is incorporated herein by reference. The comparison in FIG. 1 between the indicated efficiency of the z-z-cycle described in this application and the most efficient steam engine known; the high compression uniflow engine cycle (center curve) shows that at a cutoff of 9%, the efficiency of the invention is about 11% improved over the uniflow efficiency. However at a cutoff of 7%, it is about 16% improved, and remarkably at a cutoff of 5%, it is about 30% improved above the efficiency of the best steam cycle known. It will be noticed in FIG. 1 that at reducing cutoff levels, while efficiency of the invention improves, that of the prior art worsens.

Refer now to the remaining figures wherein the same numbers refer to corresponding parts in the various views.

Figure 2:
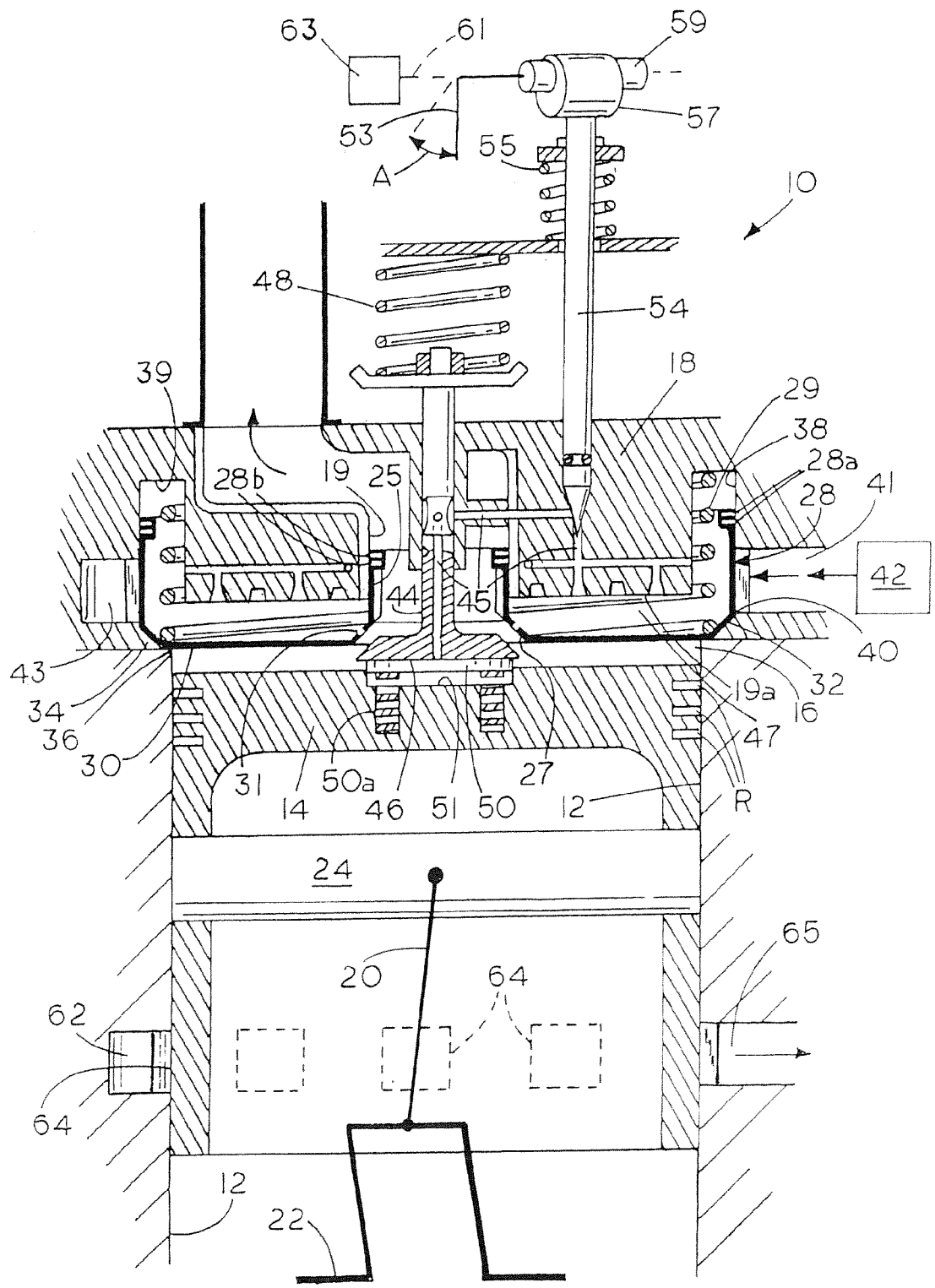
FIG. 2 is a semi-diagrammatic vertical sectional view showing the invention applied in a single stage steam engine just as the piston begins to close the exhaust and before it begins to open the inlet valve.

FIG. 2 is a diagram showing a single stage steam engine 10 according to the invention having a cylinder 12 with a piston 14 slideably and sealingly mounted in the cylinder and adjoining a steam expansion chamber 16 located between the piston 14 and a cylinder head 18 which is held in place, e.g. by bolts (not shown). A standard connecting rod 20 is operatively associated between the piston 14 and a crankshaft 22 with its outer end secured to a wrist pin 24 disposed conventionally within the piston.

Figure 5:
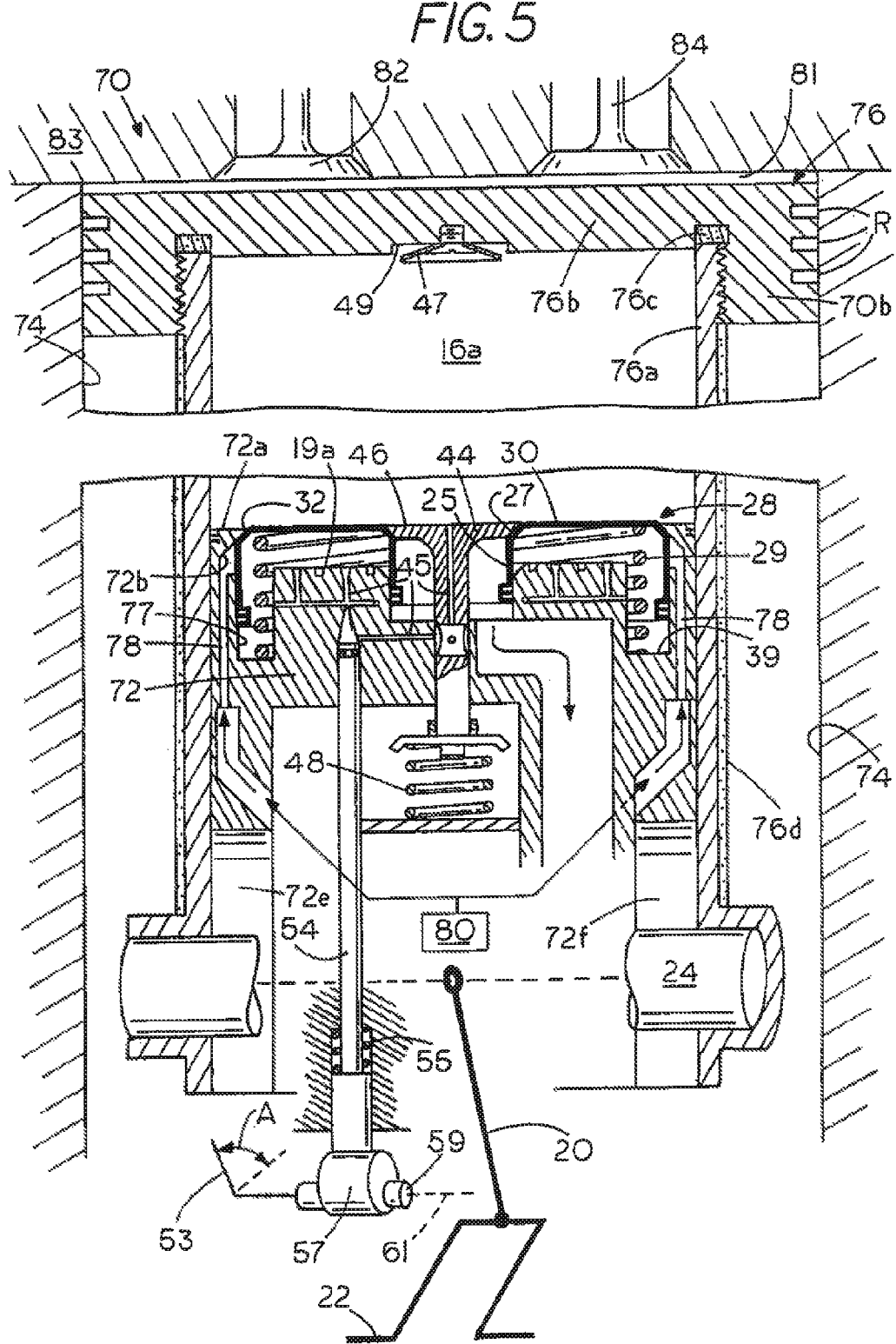
FIG. 5 is a diagram showing an application of the invention in a steam expander as a part of an internal combustion engine just before the piston reaches TDC.
Figure 9:
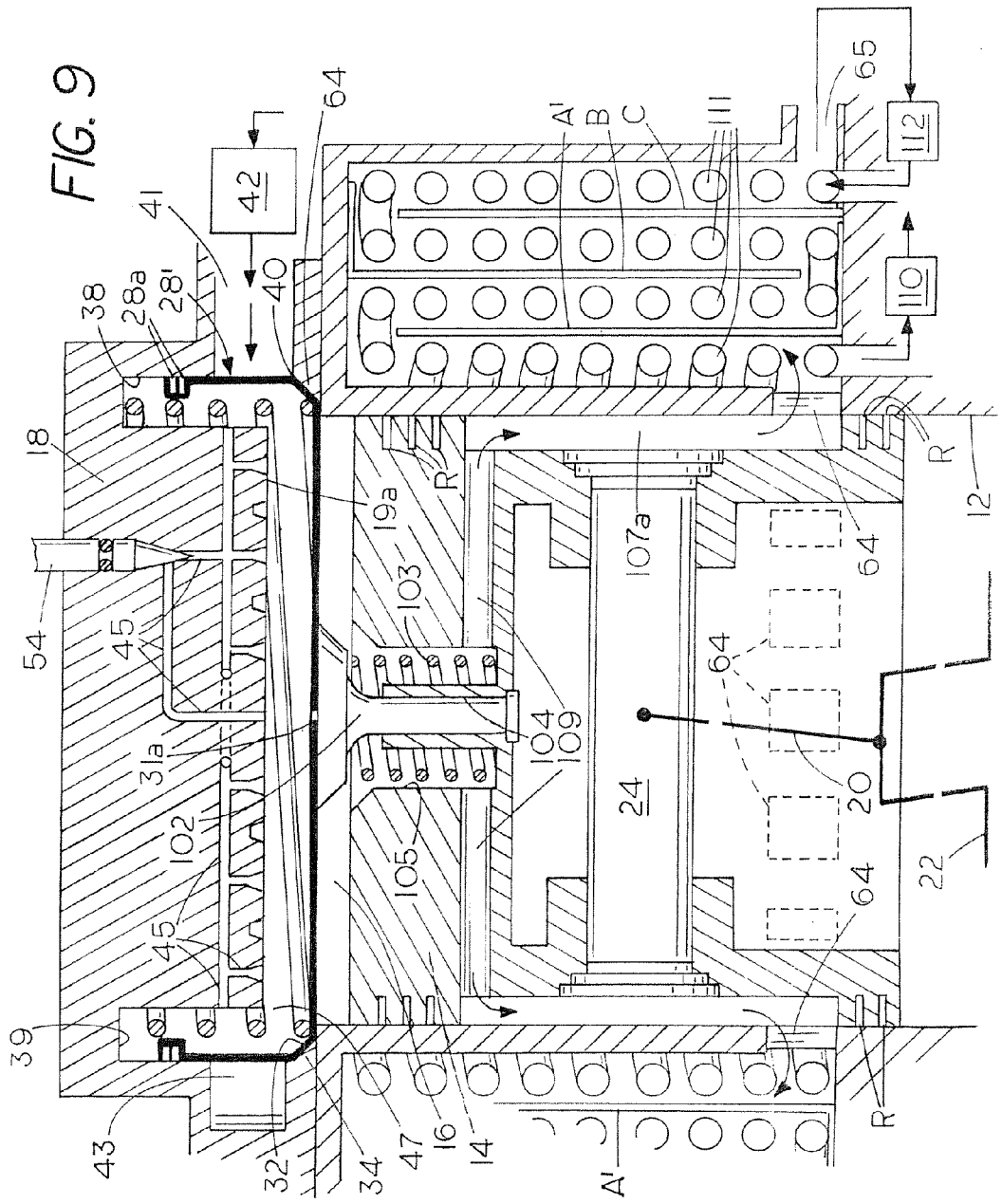
FIG. 9 is a diagrammatic vertical sectional view of a modified form of the engine of FIG. 2 wherein exhaust passes downwardly through a valve in the head of the piston rather than upwardly through the cylinder head.

Mounted in a bore 38 within the head 18 is a steam inlet valve having a valve body 28 slideably and sealingly mounted in the head 18 and having an end wall 30 with a broad face at its free end positioned to confront the piston 14 and also substantially in the plane or flush with the plane forming one end of the expansion chamber 16 in FIGS. 2, 5 and 9. The diameter of the broad lower face of end wall 30 can be smaller than shown but is most preferably at least half that of the cylinder.

The inlet valve body 28 normally closed by spring 29 is poppet piston (also shown in FIG. 3) with an annular tapered valve closure surface 32 at its free end which forms an end seal or poppet seal on a seat 34 communicating with a port 36 (in this case the same diameter as the cylinder) between the cylinder head 18 and the steam expansion chamber 16. The inlet valve body 28 which can be seen best in FIG. 3 functions as a piston shaped somewhat like a cake pan, i.e., patelliform in shape with a tubular or cylindrical sidewall aligned axially with the bore 38 in the cylinder head for allowing the valve body 28 to reciprocate therein during operation. Centered in the valve body 28 is an exhaust sleeve 25. The inlet valve body 28 can be a poppet piston provided with annular outwardly facing grooves for two sets of flexible compression rings at 28a to form a seal with the bore 38 and at 28b in the sleeve 25 to provide a second seal with a circular steam outlet channel 19 in head 18. To eliminate heat loss caused by low pressure steam, both exhaust channel 19 and sleeve 25 of FIGS. 2, 2A, 5 and 6 have heat insulating double walls (shown only in FIGS. 2 and 2A). Alternatively, exhaust can flow out through a valve in the piston, as in FIGS. 7, 8 and 9.

By sealing valve body 28 slideably in bore 38 outwardly of cylinder 12 and outwardly of a steam inlet aperture 40, a sealed chamber is created in bore 38 inwardly of valve body 28 enabling steam pressure therein to hold the valve body (acting as a piston) in the open (raised) position against a stop surface 19a which as shown in FIG. 2D has an uneven face that can be grooved as shown or have a checkerboard pattern or an embossed surface 18a that gives steam access to the upper surface of the valve 28 through steam supply ducts 45. The engine 10 has at least one and preferably several steam admission apertures 40 in an inlet manifold 43 within the head 18 which extends around the sidewall of the bore 38 communicating with a steam supply 42 through which steam is able to enter the bore 38 and then flow into the steam chamber 16 through the port 36 when the valve body 28 is raised off the valve seat 34 while also enabling steam pressure to assist in lifting and maintaining pressure below the valve for holding the valve body 28 off its seat 34 as the steam enters bore 38 below valve body 28.

Steam is exhausted through primary exhaust ports 64 in the wall of cylinder 12 and also through a supplemental exhaust valve 44 normally held open by a spring 48. Valve 44 has a poppet valve head with a valve face 46 on its free end is located in a top wall of the expansion chamber 16 which in this case comprises the end wall 30 of the valve body 28 so as to exhaust steam during operation through the sleeve 25 at the center of valve body 28 when the supplemental exhaust valve 44 is extended into the expansion chamber 16 as shown in FIG. 2 by means of an opener comprising the compression spring 48. The spring 48 yieldably biases valve 44 off of a valve seat 27 that is itself a part of the steam inlet valve body 28 concentric with the closure surface 32 also shown in FIG. 3. An exhaust valve closer can be the piston 14 or a lifter 50 on the piston positioned to contact exhaust valve 44 proximate the point the piston reaches the top dead center position. The lifter 50 which can be a disk is secured to the upper end of a helical compression spring 50a that in operation allows the lifter 50 to slide into a pocket 51 in the top of the piston far enough so that the upper surface of the lifter is flush with the top surface of the piston thus enabling the entire upper surface of the piston to contact the poppet piston body of inlet valve body 28 so as to provide a zero clearance condition between the top of the piston 14 and the upper wall of the steam expansion chamber 16 formed by the lower end wall 30 of the inlet poppet piston 28 while also seating exhaust valve 44 on the annular valve seat 27 just as the inlet valve body 28 is opened by a bump force applied by the piston or lifter 50 or both. FIG. 2 shows how the top surface of the piston 14 and the confronting surface of the expansion chamber 16 including end wall 30 are both contoured to substantially conform to one another so that their positions during operation enable the clearance in the cylinder 12 to be eliminated as the bump force is applied by the piston to open the valve body 28. Valve seat 27 is optionally provided with several breather holes 31. Spring 50a can be square wire so that when compressed there is no empty space remaining that would increase the clearance volume. It will be noted that by having the inlet valve body 28 extend across the entire cylinder as shown, the piston cannot strike a solid surface when clearance in the expansion chamber is reduced to zero as the piston moves toward TDC and makes contact with valve body 28 under zero or near zero compression conditions.

While the engine is in operation, a metering passage 45 carries steam from the chamber 16 through the supplemental exhaust valve 44 into the head then past a metering needle 54 and into a valve timing chamber 47 formed by the space within the valve body 28 between the valve body and cylinder head 18. The needle 54 is yieldably biased outwardly by a compression spring 55 and moved in or out by an eccentric or cam 57 that is mounted on a shaft 59 to pivot about axis 61 to a selected position in an arc A under the control of a hand-operated lever 53 or an engine control such as an electronic engine management computer 63 of suitable known construction. If a computer is used, the metering needle 54 can be regulated continuously throughout operation to control the steam cutoff for optimizing efficiency under changing operating conditions. However if the engine is used under a constant speed and load as, for example, driving an electric generator or ship, the cam can be eliminated and the needle held in any convenient way as, for example, by screw threads in any position selected. The stem of valve 44 can have a reduced diameter as shown near it center for conveying steam passing through the duct 45 in the center of the valve laterally through the head past the metering needle 54 then to the chamber 47 through several openings. Upward pressure in bore 38 from steam entering at 40 holds valve body 28 fully open until cutoff results from the entry of steam into a chamber 47 outwardly of the valve body controlled by needle 54 for lowering the pressure differential across valve 28 thereby causing valve 28 to close at the time selected. Any selected setting of the needle 54 fixes the time required for the pressure in chamber 47 to equilibrate to the cylinder pressure. Consequently, the cutoff will increase automatically as the RPMs rise, enabling the engine to delivery more power as the speed increases.

Communicating with the cylinder 12 at a position just above the top of the piston when it is in the BDC position is an optional preliminary exhaust manifold 62. The manifold surrounds the cylinder and communicates with it through several circumferentially spaced openings 64 in cylinder 12 that function as an automatic valve connected to a steam outlet pipe 65. The engine can be started by an electric starter motor 55 (FIG. 9A) or, if desired, by means of an electrical solenoid 34a (FIG. 9A) positioned to open the inlet valve body 28 as described in our prior application Ser. No. 12/959,025 which also describes how the valve bore 38 can be extended slightly below manifold 43 to form a delay rim around the upper edge of seat 34 to retard opening inlet valve body 28 enough to eliminate counter-torque on the crankshaft. Optionally, a narrow upwardly facing circular reaction surface for steam (not shown) on the periphery of valve body 28 and located even with the lower edge of manifold 43 can be used to allow steam at 41 to help seat the inlet valve body 28.

The operation of the engine shown in FIGS. 2-2D will now be described. The engine is shown in FIG. 2 just as the piston 14 is about to reach the TDC position which is slightly, for example, about 0.005-0.020 inch above the port 36 at the top of the cylinder 12. The piston top or the lifter 50, if used, contacts exhaust valve 44 first closing it onto the seat 27 against the downward force of spring 48, and it is at this point that the clearance in the steam expansion chamber reaches zero. As the piston 14 contacts the valve body 28 and begins to lift it off its seat, the clearance, while initially zero is followed by a small negative clearance. The end wall 30 of the valve and the top of piston are both flat, thus conform closely to one another while in contact. In this way, a zero clearance with zero compression is achieved. As the piston continues to rise after contact with the valve, for example, about 0.005-0.020 inch after contact, it lifts the poppet piston valve body 28 off the seat 34 against the force of spring 29. When this happens, as shown in progressive stages in FIGS. 2B and 2C, the high pressure steam from the supply 42 and in the steam supply manifold 43 will apply a sudden axial upward force which serves as the pressure assist on the inwardly directed tapered valve surface 32 acting as a steam reaction surface now exposed to the pressure of the steam, thereby almost instantly propelling the valve body 28 to a fully open position against stop surface 19a and optionally against a stop 39 while compressing spring 29 and simultaneously driving the piston 14 down so as to transmit power to the crankshaft 22. The face of end wall 30 of valve 112611 can be set, say, 0.005 inch below (inwardly) from the TDC position of the top of the piston. Good operating results were obtained by lifting the upper edge of the tapered valve closure surface 32 of valve 28, 0.007 in. (0.18 mm) above the lower edge of the admission aperture 40. The operation of the valves as described prevents substantial loss of admission mass through the exhaust valve and clearance between the end of the cylinder and the piston is substantially at a minimum during a transition from exhaust to steam admission.

Of the three springs 29, 48 and 50a, spring 48 applies the least force and is exceeded by that of spring 50a to assure that the exhaust valve 44 is seated. Spring 29 is stronger than spring 50a to assure that the exhaust is closed before the inlet valve body 28 begins to open due to the bump force applied by the piston or by lifter contact with the valve body 28 and the subsequent upward thrust of the steam on the valve body 28 which exceeds the downward force of the spring 29. While the piston 14 alone can close the exhaust valve, the optional lifter 50 is helpful in making sure that the exhaust valve is closed at or before the moment steam first begins to enter the clearance volume 16 by keeping it closed even as the piston begins to descend until the steam itself is able to exert an upward force on its lower face. The face 46 of the valve 44 or the top of the lifter 50 can be embossed over its entire surface with an irregular surface texture, small surface corrugations or checkered pattern for assuring that steam has access to the entire lower face 46 of the valve 44 so as to overcome the force of spring 48.

During the return (exhaust) stroke, the pressure in chamber 47 drops to ambient or condenser pressure. Once the exhaust valve 44 is open, assurance that the pressure in chamber 47 has dropped to that of chamber 16 when exhaust valve 44 closes can be facilitated by the optional breather holes 31 through the valve seat 27 which are shut off whenever the valve 44 is seated. In this way, there is added assurance later in the cycle when exhaust valve 44 closes that steam in the chamber 47 behind the valve 28 is at ambient pressure i.e., without pressure remaining from the previous cycle. After valve 44 closes, the breather holes 31 remain sealed while the metering ducts 45 and valve 54 are active in regulating cutoff.

At the end of the power stroke, the top of the piston will pass below and thus automatically open the ports 64 in the optional first phase of a biphasic exhaust. At that point in the cycle, the exhaust valve opener spring 48 will have already opened the supplemental exhaust valve 44 and will keep the exhaust valve 44 open until it is closed proximate an end of the return stroke. Closing valve 44 at or proximate the end of the return stroke is sufficient to reduce or eliminate a substantial compression of residual steam remaining in the expansion chamber. Then holding the exhaust valve closed as the inlet valve is opened, prevents a loss of admission mass through the supplemental exhaust valve 44. By assuring that little if any remaining steam is compressed in the expansion chamber, work performed in any recompression of residual steam is either entirely absent or a low proportion of the work output of the engine. A minor amount of compression caused by steam trapped as the exhaust valve closes in, say, the last fraction of an inch of the return stroke can occur e.g. as spring 50 becomes compressed after valve 44 closes and is usually not objectionable if little negative work occurs.

Prior bump valves were often difficult to open and suffered from a lack of longevity as a result of fatigue stresses resulting from opening against steam pressure which may be 1000 psi or more. In contrast, the force applied to the valve body 28 is not opposed by steam pressure but only by the force of the spring 29. The invention therefore allows the valve to be opened easily with little stress on valve components since the required opening force is independent of system pressure.

Steam cutoff resulting from the closing of the inlet valve 28 is controlled by the steam entering space 47 through the metering valve 54 as noted above and in our prior application Ser. No. 12/959,025. Steam holds valve 28 open during the power stroke until the steam pressure differential across valve 28 falls enough to equal the force of spring 29. Valve 28 is then closed by spring 29, thereby cutting off the flow of steam at the desired fraction of the power stroke that has been selected. When this happens, exhaust valve 44 continues to be held closed by cylinder pressure since its spring 48 is considerably weaker, e.g., 10-20 pounds; a force chosen to enable the exhaust valve to open at the optimum steam release point near the end of the power stroke or at the point when the pressure drops suddenly as the piston clears the optional automatic exhaust ports 64. The spring force of spring 48 is selected to be great enough to open the exhaust valve 44 when cylinder pressure has dropped to the desired release point. The high temperature steam filling chamber 47 also reduces heat loss from low pressure steam by heating valve 28. If the automatic exhaust through ports 64 is used, spring 48 can be selected to open the exhaust valve when the piston clears ports 64. When the engine is applied to operate at a constant RPM under steady state conditions, the size of the ducts 45 themselves with no metering valve 54 present can be used to set a selected steam cutoff; but for other applications, the cam or eccentric 57 can be adjusted as required during operation to vary the setting of the metering valve 54 by pivoting shaft 59 as described.

It should be noted that any, slight microscopic lift of valve 28 will allow steam pressure to act against the face of its outer wall 30 thereby providing the power assist to achieve the full open position as the piston separates from the valve and moves downwardly through the power stroke. It will also be noted that the steam pressure assist makes it possible to open valve 28 very close to TDC, e.g. 0.005 in. so that both the piston velocity at the end of the stroke and impact on the valve are minimized. In this way, the steam power assisted opening feature of the invention makes it possible to take advantage of the greatly reduced piston impact that occurs during the last few thousandths of an inch of piston travel approaching top dead center due to the much slower piston velocity upon contact. The inlet valve will therefore open with a gentle nudge rather than requiring a hard knock.

In a modified form of the engine of FIG. 2, rather than exhausting upwardly through the inlet valve, exhaust can if desired be removed through a valve in the piston as will be described more fully below in connection with FIG. 9.

Figure 2A:
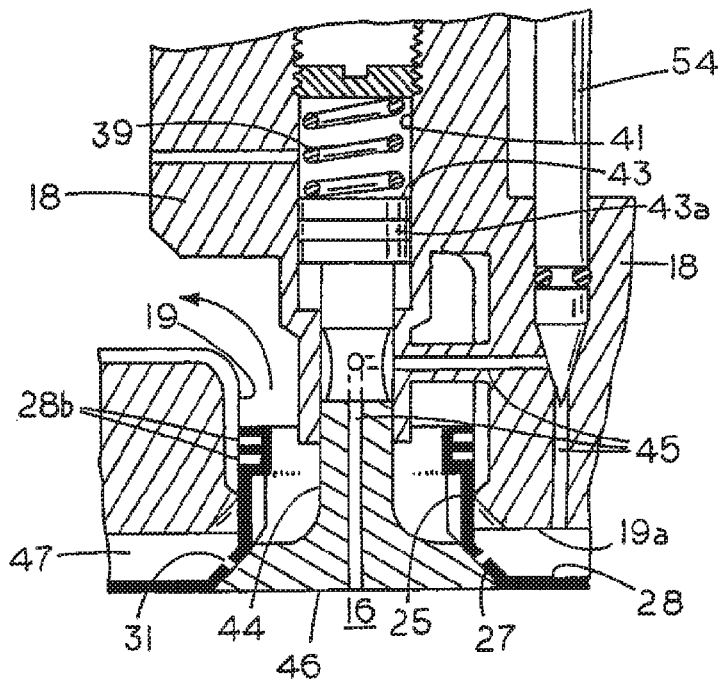
FIG. 2A is a partial vertical sectional view of a modified form of exhaust valve assembly of FIG. 2 on a larger scale with the exhaust valve in the closed position.
Figure 2B:
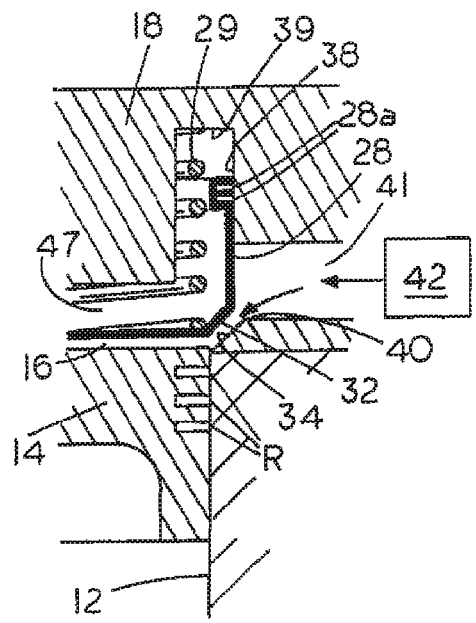
FIGS. 2B and 2C are partial views of FIG. 2 on a larger scale showing successive stages of steam inlet valve pressure assisted admission.
Figure 2C:
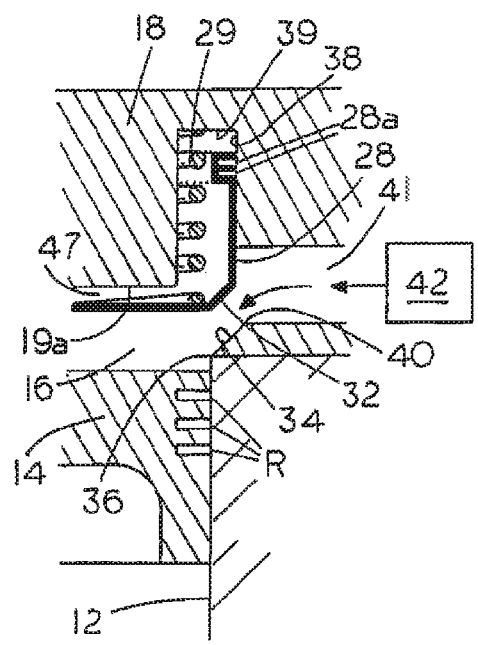
Figure 3:
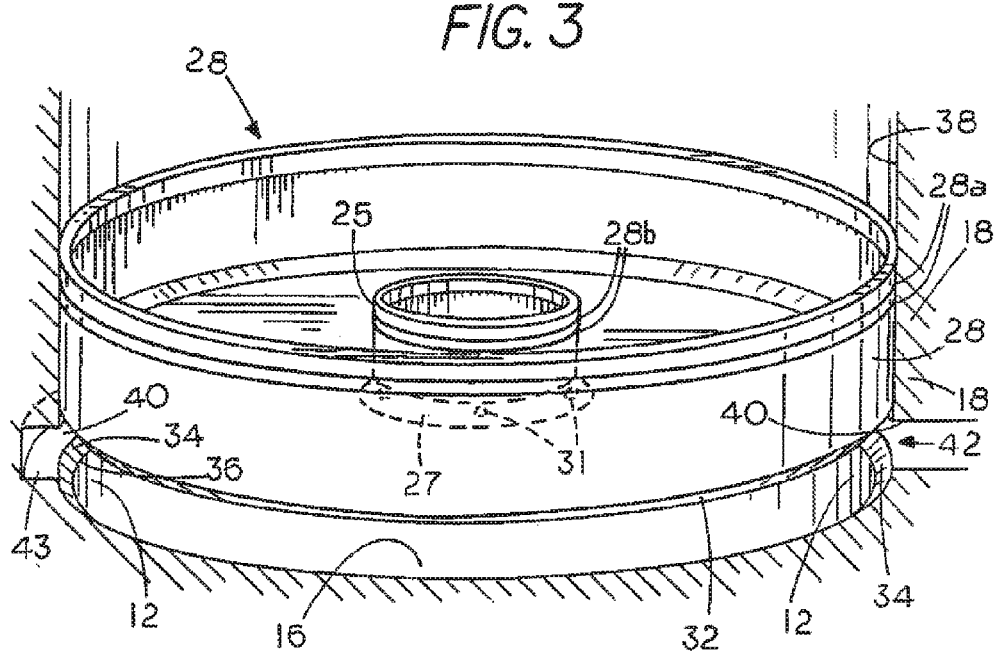
FIG. 3 is a perspective view of an inlet valve body in accordance with one preferred form of the invention.

Refer now to FIG. 2A which illustrates an optional construction that is similar to FIG. 2 except for the addition to valve 44 of an isolating piston 43 having a compression ring 43a to seal the piston 43 slideably within a chamber 41 containing a compression spring 39 for applying a selected downward opening force on the valve 44. In this optional form, there are three forces acting on the exhaust valve 44; the upward force due to steam pressure in the clearance volume 16, the downward pressure of spring 39 and the downward steam pressure in chamber 41 against the upper surface of the isolating piston 43. In operation, the transfer of steam into chamber 41 enables the downward force of the spring 39 to open the valve at a point in the cycle when there is sufficient pressure in chamber 41 so that spring 39 is able to overcome the net upward force resulting from the pressure differential between chamber 41 and clearance volume 16. Pressure in chamber 41 falls to ambient during exhaust. During exhausting, communication also exists between high pressure in chamber 47 and the exhaust outlet chamber 19 via breather holes 31, allowing chamber 47 to bleed down to ambient pressure. The function of the isolating piston 43 is to isolate chamber 47 from the low pressure exhaust path during the time that needle valve 54 allows pressurization of 47, and consequently cutoff. The contribution of spring force 39 and area of isolation piston 43a to implement cutoff via spring force 29 can be computed from well known force-area relationships by those skilled in the art.

Figure 6:
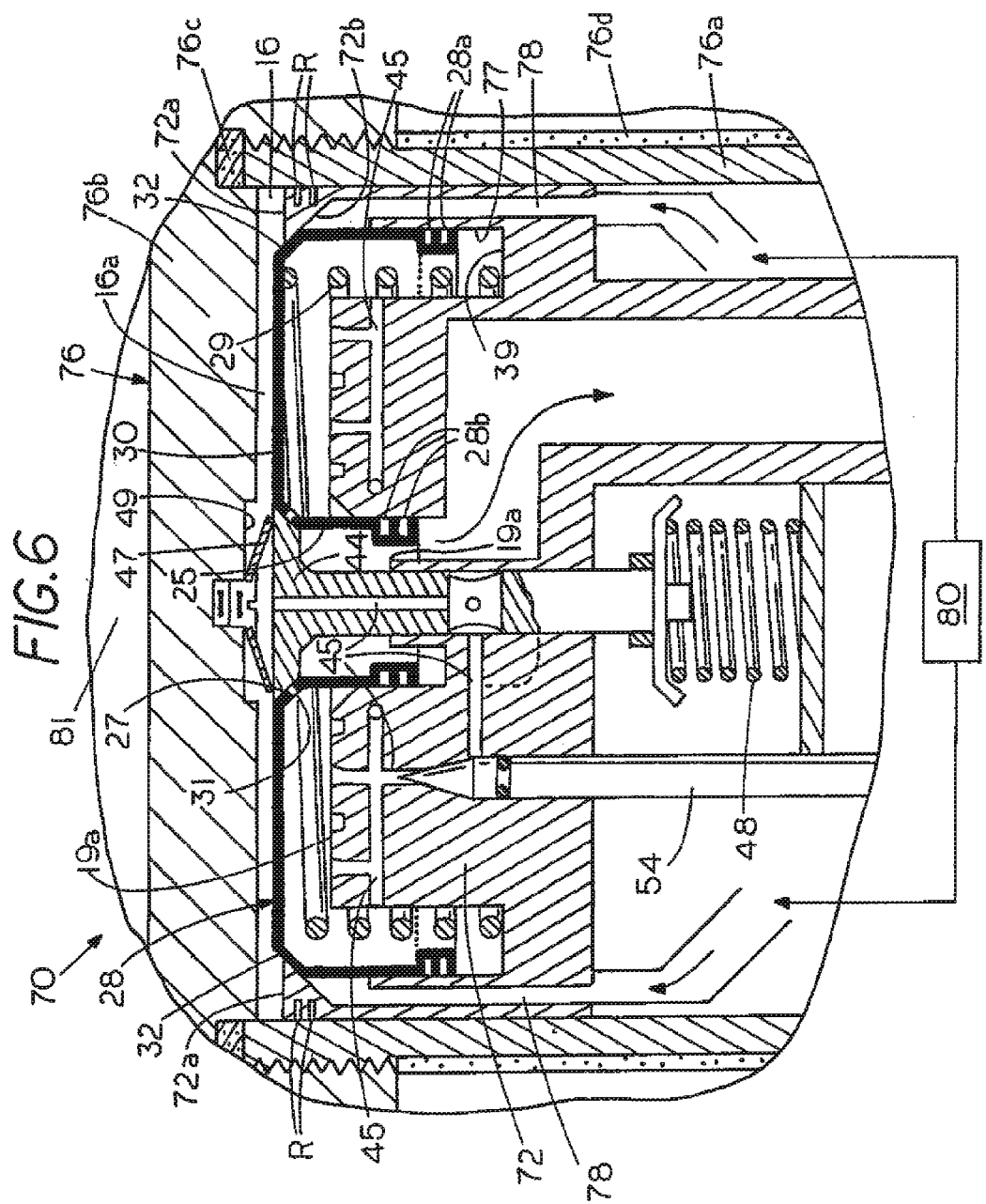
FIG. 6 is a partial view of FIG. 5 on a larger scale showing the piston approaching BDC at the end of the exhaust stroke and the beginning of the power stroke as the exhaust valve closes but before the inlet valve is opened.

Refer now to FIGS. 5 and 6 which illustrate how the invention can be used as an expander that forms a part of an internal combustion steam engine 70 of the type described in our prior application Ser. No. 12/959,025 and related U.S. Pat. No. 8,061,140, which are incorporated herein by reference. In FIGS. 5 and 6, the inlet valve body 28 constructed as described above is mounted in a fixed inward cylinder head 72 spaced concentrically within combustion cylinder 74 inside a tubular, i.e. trunk style piston 76. The piston 76 is machined to provide a smooth cylindrical surface inside as well as outside so as to be slideably and sealingly related to both the inner wall of cylinder 74 as well as the outer wall of the inner cylinder head 72 and both the piston and the fixed inward cylinder head 72 are provided with annular slots for flexible compression rings R. As shown in FIG. 5, the inner head 72 is provided with vertically disposed slots 72e and 72f on opposite side through which the wrist pin 24 reciprocates during operation inwardly of the head 72 as described in the prior related application Ser. No. 12/959,025 and U.S. Pat. No. 8,061,140. Steam is fed to twelve supply ducts 78 arranged in a circle from a steam supply 80, then to the seat 72b of valve 28. The engine has an outward cylinder head 83 containing combustion inlet and exhaust valves 82 and 84 leading to a combustion chamber 81. A high pressure steam expansion chamber 16a is located within piston 76 above the inward head 72 for recovering waste combustion heat. A connecting rod 20 and crankshaft 22 inwardly thereof are operatively associated with the piston 76 through a standard connection to the wrist pin 24. The piston 76 is a double-acting piston that has power strokes in both directions along its axis of movement. The terms "inward" and "outward" herein mean closer and further from the crankshaft, respectively.

The fixed inward cylinder head 72 supports the inlet valve 28 in an axial bore 77 so that the outer face of the end wall 30 of the valve body 28 preferably projects, as shown, slightly above the free upper end wall 72a of the inward cylinder head in a position to contact the inside surface of the piston head all the way across. It will be seen in this case that the inlet valve 28 is yieldably biased to a seated position on a tapered seat 72b within the inner cylinder head 72 by spring 29 so that the valve end wall 30 covers the greater part of the cylinder head and has a circular periphery that is spaced centrally from an outer edge of the inward cylinder 72 head by a ring 72a of the cylinder head surface. The ring 72a is relatively narrow such that its width (i.d. to o.d.) is preferably less than the diameter of the face of valve end wall 30. The ring 72a supports the valve seat 72b concentrically therein so as to communicate through the several steam supply ducts 78 with a steam supply 80. In FIGS. 5 and 6 as in FIGS. 2-3, it can be seen that the face of wall 30 covers substantially the entire end of the cylinder except the narrow ring 72a and that its contact with the piston results in a clearance of zero.

The operation of valves 44 and 54 is the same as described above in connection with FIG. 2, however in this case, valve 44 which is held closed by steam in FIG. 2 is closed (FIG. 6) by a Belleville spring 47 held in place on head 76b by a screw. A pocket 49 is provided on the inward face of the piston into which the spring 47 becomes recessed when the valve 44 is seated. In one engine the pocket 49 had a depth of 0.029 in., largely occupied by spring 47. As the piston approaches the BDC position, it contacts virtually the entire face of the end wall 30 of the valve 28 so as to provide a bump force to valve 28 lowering it off its seat against the force of spring 29. As the valve body 28 leaves its seat, the high pressure steam then admitted through the multiple inlet ducts 78 is able to almost instantly enter between the inner wall of the piston 76 and the face of the end wall 30 of the inlet valve 28 thereby forcefully driving it by steam assist to a fully open position against stop 19a. It will be seen that proximate BDC most of the inner end wall of the piston is then in contact with the end of the expansion chamber 16a defined by the face of the end wall 30, achieving a clearance that is actually zero except at the narrow ring 72a of the top surface of the inward cylinder head surrounding valve 28 where the clearance is typically about 0.020 inch. FIG. 5 also shows the combustion chamber 81 which communicates with combustion inlet valve 82 and exhaust valve 84 of the engine operating on any combustion cycle, e.g. otto, diesel, Atkinson or two-stroke.

Except for having a cylinder clearance that is actually zero, the operation of the dual cycle internal combustion steam engine herein is generally similar to that described in connection with FIG. 9 of prior application Ser. No. 12/959,025 which is incorporated herein by reference. Heat energy of the exhaust from combustion chamber 81 is recovered as a waste energy source for heating the steam supply 80 that is fed to expansion chamber 16a. The exhaust valve 44 is held closed by steam pressure during the power stroke as in FIGS. 2-2C above. It will be seen in FIG. 5 that the piston is a double-acting piston, powered on the downstroke by combustion in chamber 81 and on the upstroke by the steam admitted into chamber 16a.

The piston 76 of FIGS. 5 and 6 is shaped somewhat like a mushroom with an enlarged head 76b that can be formed, for example, from an aluminum alloy having slots for compression rings R and an axially extending sleeve 76a of a smaller diameter than the head 76b rigidly secured to the head 76b, for example, by screw threads sealed by flexible fiber packing 76c. The sleeve 76a can be iron or steel preferably encased in a reinforcing a wrap 76d formed from a continuous filament winding such as carbon, glass or wire preferably bonded together in a suitable matrix, such as plastic or a ceramic. Bearings are provided at the lower end of the sleeve 76a to hold the ends of wrist pin 24.

Figure 4:
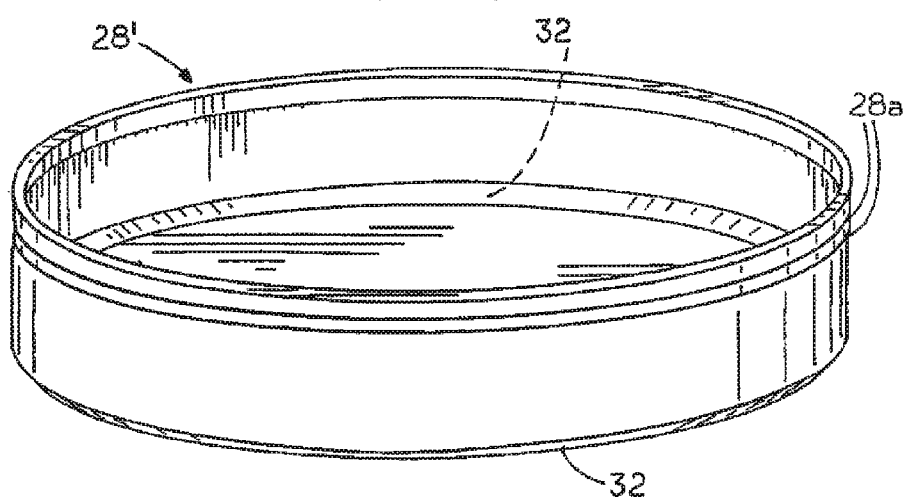
FIG. 4 is a view similar to FIG. 3 of a modified inlet valve body in accordance with the invention.
Figure 7:
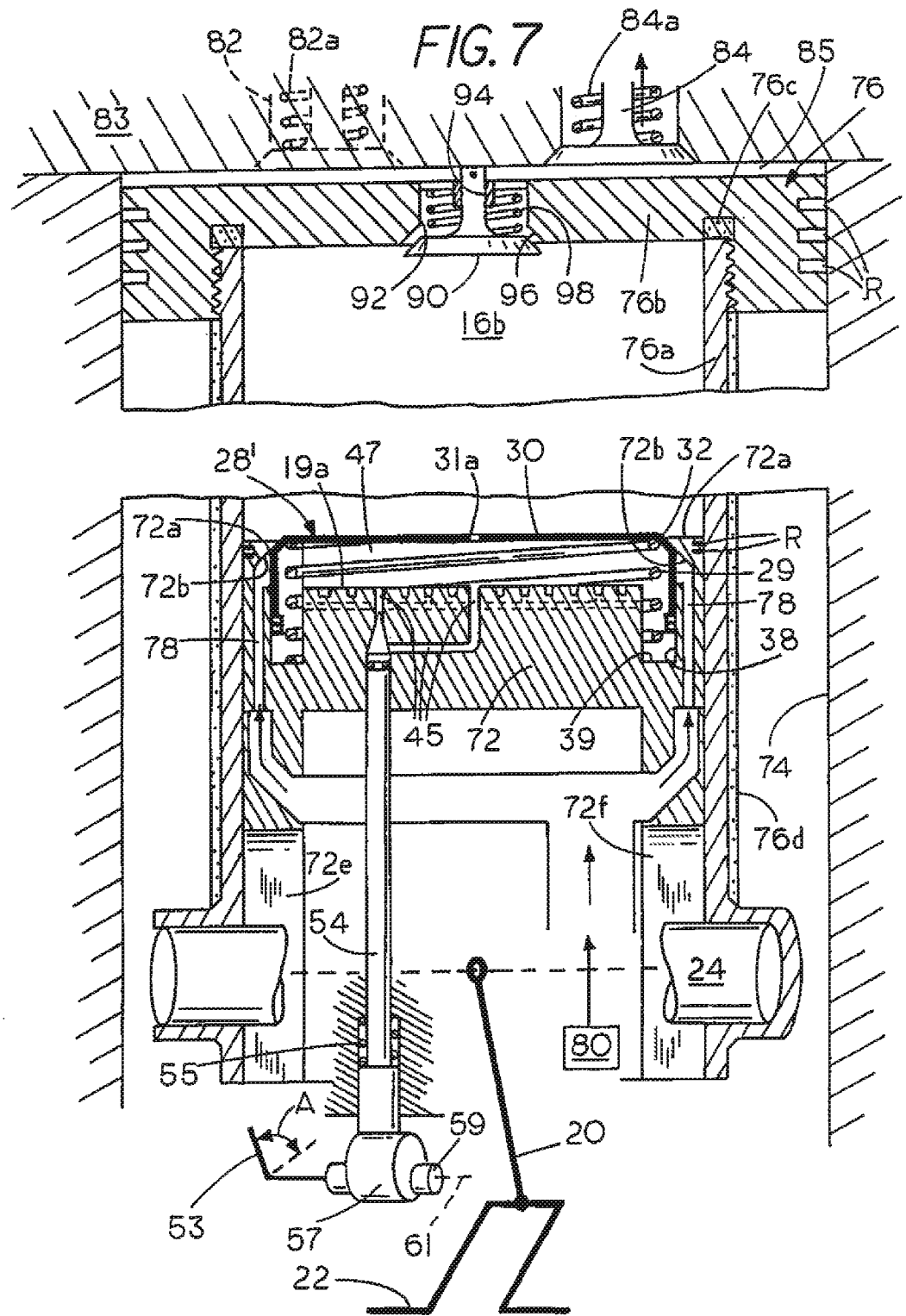
FIG. 7 is a diagrammatic vertical sectional view showing an application of the invention in a compound double expansion steam engine.

Refer now to FIG. 7 which shows how an automatic inlet valve of the invention and piston 76 similar to FIGS. 5 and 6 can be used in a double expansion steam engine having high and low pressure chambers in a single cylinder with a piston similar to that of FIGS. 5 and 6. In FIG. 7, piston 76 is slideably and sealingly mounted within the cylinder 74 as well as over an inward cylinder head 72 which is provided near its free end with compression rings R as in FIG. 5. The piston 76 provides power strokes in both directions along the axis of the cylinder. FIG. 4 illustrates the steam inlet valve body 2W of FIGS. 7-9 in which the sleeve 25 of FIGS. 2-6 is omitted leaving the center and the face of wall 30 substantially flat.

The piston 76 of FIG. 7 has a transfer valve 90 comprising a poppet valve mounted to reciprocate in a transfer port 92 extending through the piston head 76b. The stem of the transfer valve 90 is slideably mounted in a guide 94 and is yieldably biased inwardly off of valve seat 96 by a compression spring 98 that is mounted between the head of valve 90 and radial struts that support the guide 94 in port 92. When valve 90 is seated, the free upper end of the stem extends up a short distance above the top of the piston 76, e.g., 0.190 inch so that when the piston approaches the outer cylinder head 83, contact between the tip of the stem and the outer cylinder head 83 opens the valve 90 and as the piston descends after reaching TDC, spring 98 then continues to hold valve 90 open. Proximate TDC, the top of the piston contacts steam exhaust valve 84 normally held open by spring 84a, sliding it outwardly to the closed position as a low pressure steam expansion chamber 85 between the piston 76 and the head 83 is reduced to a minimum volume with a final clearance that is sufficient to prevent contact, e.g., 0.020 inch clearance. A spring (not shown) of the kind used in FIG. 6 can be secured to piston head 76b to help close valve 84.

The piston 76 in FIG. 7 thus functions as a part of a compound double expansion steam engine with the high pressure expansion chamber 16b between the inward head 72 and the piston and the low pressure steam expansion chamber 85 between the piston 76 and the outer head 83. In the example shown, a steam expansion ratio of about 2.5/1 is provided. If desired, a second spring biased inwardly opening valve 82 having a spring 82a can be provided, operating in the same manner as valve 84 to further reduce exhaust pressure in chamber 85 as the piston moves outwardly.

Steam inlet valve 2W (also shown in FIG. 4) is simplified by having no sleeve 25 as in FIGS. 5 and 6 but instead has a small aperture 31a at its center aligned with the outward mouth of the duct 45 which in this embodiment communicates through the center of the inward cylinder head 72 to supply steam to the metering needle 54. When open, the inner surface of valve 28' abuts against a stop surface 19a surrounding the mouth of the duct 45 thereby forming a seal when the surfaces make contact as valve 28' is opened. This enables steam to pass through port 31a, then through duct 45 into the chamber 47 under the control, i.e. selected setting of metering needle valve 54 to establish the steam cutoff as determined by the time period for the pressure differential across valve 28' to fall sufficiently to allow the spring 29 to close valve 28'. The steam cutoff is either fixed or controlled, e.g. by cam 57 to optimize the efficiency of the engine or, alternatively, to provide more power when the steam cutoff is increased as described in our prior application Ser. No. 12/959,025, which is incorporated herein by reference.

The piston of FIG. 7 as in 5 and 6 has a mushroom shape with an enlarged head 76b at an outer end supporting circumferentially extending piston compression rings R and a concentric inwardly extending cylindrical sleeve portion 76a as in FIGS. 5 and 6 of a smaller outside diameter than the piston head that is secured to the piston head at its outer end and extends axially toward the crankshaft to hold the high pressure steam in expansion chamber 16b between the piston head 76b and the fixed inward cylinder head 72.

During operation of the engine of FIG. 7, as the piston descends, transfer valve 90 is closed by making contact with valve 28'. Spring 98 is rated to allow transfer valve 90 to close before steam inlet valve 28' can open. As the valve 28' begins to open, the force of high pressure steam on closure surface 32 and then on its outer surface 30 will almost instantly drive it to a fully open position with its inner surface and the aperture 31a sealed around the mouth of duct 45 while abutting against the stop surface 19a.

The high pressure steam at, say, 750 psia is injected from steam supply 80 through twelve ducts 78 past the seat 72b of valve 28' into high pressure chamber 16b as soon as the inner surface of the piston 76 and the valve 90 contact the outer face of end wall 30 so as to establish a zero clearance in the nascent high pressure expansion chamber 16b with the piston 76 proximate the BDC position just before lifting valve 28' off its seat. The closure of valve 90 just as valve 28' opens assures that there is zero compression when steam is injected. As the piston changes direction and begins to rise, steam in high pressure chamber 16b will remain at supply pressure until cutoff results from the seating of inlet valve 28' under the control of needle valve 54 as described above and for the rest of the outward stroke the steam performs expansion work as its volume increases while keeping valve 90 shut. However, as soon as the piston approaches the cylinder head 83 proximate the TDC position, contact between the stem of valve 90 and the head 83 will open valve 90 allowing the high pressure steam in chamber 16b to enter the potentially greater volume of the low pressure chamber 85. At this point, low pressure chamber 85 will have been sealed by virtue of the piston having just closed the exhaust valve 84 which is then held closed by the continuing steam pressure on its lower surface. On the down stroke, the steam will perform more work while flowing from the high pressure chamber 16b into the greater volume of the low pressure chamber 85 as steam expands through the transfer port 92 which is held open during the inward stroke by the valve spring 98. Nearing the end of the inward stroke, steam pressure on exhaust valve 84 drops sufficiently to enable the spring force selected for spring 84a to open valve 84 at the optimum release point in the cycle somewhat before the end of the inward stroke.

In this way, the higher efficiency advantages of a double acting compound engine are obtained without the requirements for transfer pipes, cam shafts or cams while also having the further higher efficiency advantages of the zero clearance with zero compression operating cycle (Z-Z cycle) disclosed herein and in prior related application Ser. No. 12/959,025. Moreover, expansion work can be performed in two successive expansion stages within the same cylinder for an increase in total work output using a single piston and cylinder for each complete cycle instead of two separate cylinders and pistons. In addition, the absence of traditional transfer pipes or receiver between high and low pressure cylinders eliminates heat loss and flow restriction found in a standard double expansion engine.

Figure 8:
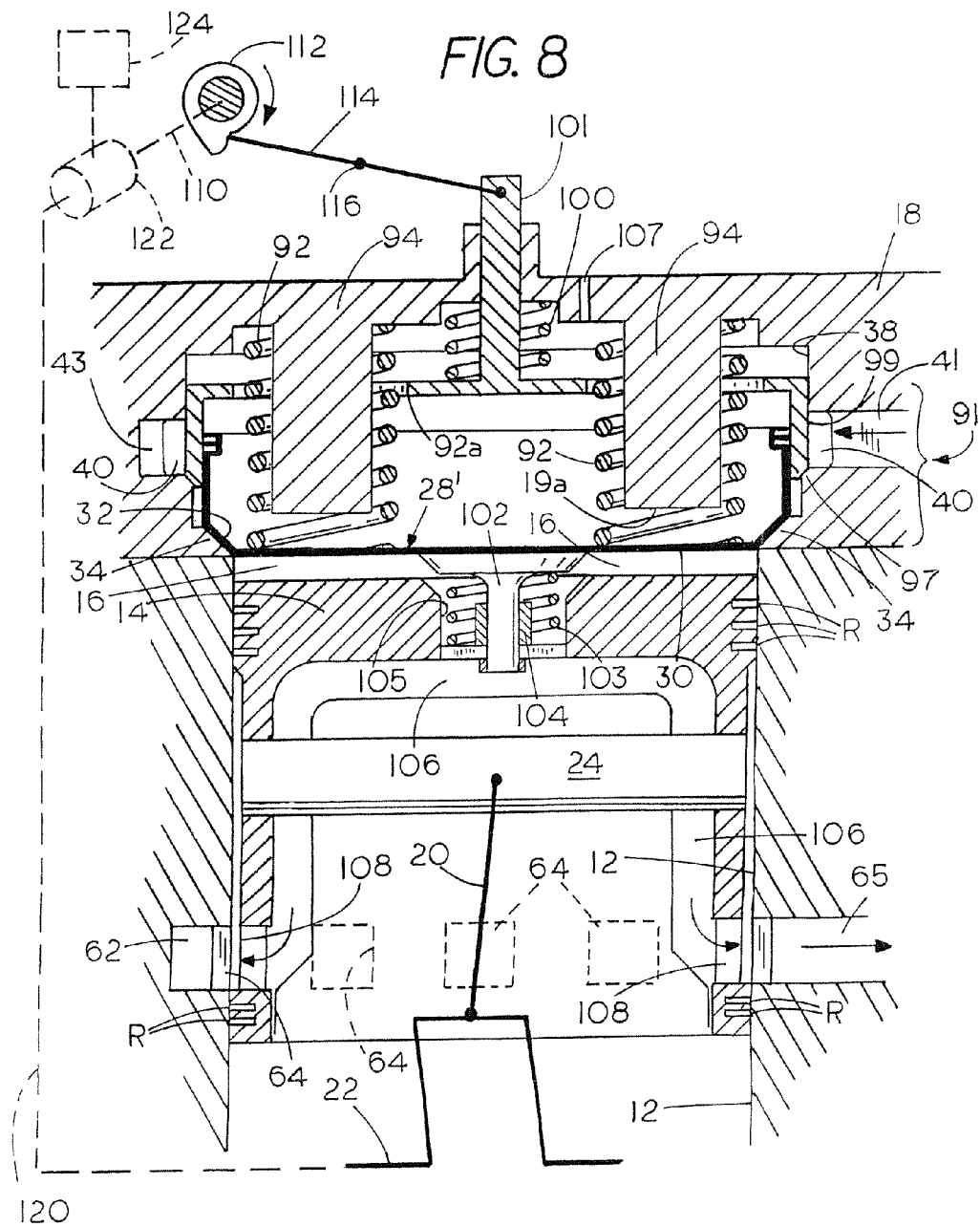
FIG. 8 is a diagrammatic vertical sectional view showing an application of the invention in a duplex steam inlet valve.

Refer now to FIG. 8. The pressure differential control by needle 54 across the steam inlet valve described above in connection with FIGS. 2-7 provides outstanding results in establishing a selected cutoff and increasing cutoffs at higher RPMs. However, in some cases, control over a wider range or precise computerized control under variable operating conditions is desired. To fulfill these requirements, the invention is shown in FIG. 8 in an engine with a second valve element in series with inlet valve 28' so as to provide the advantages of the inlet valves described in the previous embodiments together with additional versatility during variable, unusual or abnormal operating conditions.

FIG. 8 illustrates how the invention can be applied to a single stage steam engine having an inlet valve indicated generally at 91. A patelliform inlet valve body 28' as already described in FIG. 7 is mounted for axial sliding movement within the head 18 and is yieldably biased to a seated position on valve seat 34 by four compression springs 92 each surrounding a fixed stop 94 (only two pairs being shown) arranged in a circle around the cylinder axis, and each passing through an opening 92a in the top wall of a sleeve valve element 99 in head 18. Outwardly of the seat 34 is a concentric second valve seat 97 that is sealed, as shown, by an annular valve surface at the lower edge of the sleeve valve element 99 which is slideably mounted in the bore 38 as well as being slideably and sealingly mounted over the valve body 28' and yieldably biased inwardly to a seated position by a compression spring 100 surrounding its valve stem 101. Sleeve valve 99 seals the steam supply pipe 41 which carries steam to a circular manifold channel 43 surrounding both inlet valve body 28' and sleeve valve element 99. Channel 43 communicates with bore 38 through several spaced ports 40. It can be seen that the valve seats 34 and 97 are concentric and are axially as well as radially displaced from one another so that the duplex valve 91 thus formed will only be open when both of the series related valve elements 28' and 99 are unseated and only then allow steam to flow from the steam supply pipe 41 and circular steam manifold channel 43 into the steam chamber 16.

To exhaust steam, the piston 14 in this embodiment is provided with a poppet valve 102 in the piston head as in FIG. 7 except that it opens outwardly. Valve 102 is slideably supported in a guide 104 which is held on radial struts in the center of a passage 105 through the piston head so that when open, steam can flow from the expansion chamber 16 through the passage 105 into a chamber 106 on the interior wall of the piston 14, then through circumferentially distributed openings 108 and finally through ports 64 in the cylinder into the low pressure manifold 62 and exhaust pipe 65 to atmosphere or to a condenser (not shown) for recycling the steam in a closed circuit. Rings R at the bottom of the piston prevent low pressure steam from entering the crankcase of the engine. The bore 38 holding valve 99 can be vented to atmosphere at 107. In the case where a straight line motion mechanism is used such as a piston rod and crosshead or Lanchester crank, the crankcase can be isolated from the cylinder block by an oil seal packing (not shown) and the lower set of rings R can be eliminated.

The sleeve valve actuator of the engine of FIG. 8 will now be described. Slightly before the piston reaches the top center position, e.g. about 10 degrees in advance, rotation of a camshaft 110 which is geared to crankshaft 22 will cause a spiral cam surface of a cam 112 to pivot a valve rocker 114 counterclockwise about pivot 116 so as to raise the sleeve valve 99 from seat 97 thereby opening the high pressure steam apertures 40 in the bore 38 but no steam will flow since valve 28' remains seated. It can be seen that as the spiral cam 112 rotates, sleeve valve element 99 will be retracted slowly but will close abruptly when the rocker 114 reaches the outer end of the spiral thereby providing cutoff with a snap closing action.

During operation of the engine in FIG. 8, at the beginning of a cycle with the piston moving outwardly and exhaust valve 102 in an open position, steam will flow from chamber 16 through valve 102 down through the chamber 106 within the piston then through ports 64 and out through exhaust pipe 65 until the top of the exhaust valve 102 contacts the end wall 30 of the steam inlet valve body 28' whereupon the exhaust valve 102 will begin to close due to its engagement with valve 28' causing complete closure of the exhaust valve proximate the instant the top of the piston contacts the inlet valve 28' so as to apply a bump force under conditions of zero clearance. The final upward movement of the piston then raises the inlet valve 28' off the seat 34. Even a minute lift, such as 0.005 inch, is sufficient as the piston is about to reach TDC. As soon as the steam is able to enter the cylinder past the seat 34, a sudden burst of steam between the top of the piston and the inlet valve will almost instantly drive the valve body 28' outward by applying a steam pressure assist to the fully open position seated against the stops 94. Unlike a conventional harmonic valve, the valve 28' springs open in only a few milliseconds against the closing force of springs 92. The series related valve elements 28' and 99 are independently moveable and operate to prevent the admission of steam when either is in a seated position. The rapid valve action enables the invention to increase work output and reduce fuel consumption.

With sleeve valve 99 now open and valve 28' having been previously opened, high pressure steam at substantially supply pressure will fill the expansion chamber 16 until the appropriate moment for the steam cutoff which is accomplished by closing valve element 99 at the time selected through an operative connection indicated by a dashed line 120 between the crankshaft 22 a phase regulator 122 under the control of the operator using a lever or dial (not shown) on regulator 122 that can be turned manually or by an electronic controller 124 such as an electronic engine management computer of suitable known construction as described in a parent application Ser. No. 12/075,042, now U.S. Pat. No. 7,997,080, Ser. No. 12/387,113, now U.S. Pat. No. 8,109,097 or in copending application Ser. No. 12/959,025 so as to regulate the steam cutoff as a fraction of the power stroke for optimizing thermal efficiency or providing greater power as the need arises during operation.

Valve 28' is thus opened by a bump force applied to it by the piston always at the same time in the cycle proximate TDC. The closing of sleeve valve 99 is however variably and controllably related to the crankshaft position. Rather than changing with engine speed, steam cutoff as a fraction of the stroke in FIG. 8 is determined solely by the time interval between the opening of valve body 28' and closing of sleeve 99 due to the lag set by phase regulator 122 relative to a null point on crankshaft 22 and the phase is in turn directed by engine controller 124 or by the operator. Adjustment of the phase regulator 122 is therefore able to precisely time the closing of sleeve 99 so as to vary the cutoff of steam entering chamber 16 as the need arises, making possible precise optimization of efficiency under changing operating conditions.

There are two stages to the biphasic exhaust function. The first stage occurs when the top of the piston is located at the BDC position just below the exhaust ports 64 enabling cylinder pressure to drop to ambient or condenser pressure. This pressure drop will start the second stage by causing valve exhaust 102 to open unless its spring 103 has been selected to release remaining steam at a somewhat higher pressure. In either case during virtually the entire upward return stroke of the piston to the TDC position, exhaust valve 102 is held open by spring 103 allowing steam in chamber 16 to drop to ambient pressure as it flows through the chamber 106 in the piston and finally out through exhaust pipe 65.

It should be noted that in FIGS. 7 and 8 as in the previous embodiments, the exposed face of inlet valve wall 30 covers all or substantially the entire cross-sectional area of the cylinder and that its contact with the piston results in a clearance of zero in the steam expansion chamber 16 while there is simultaneously little, if any, compression of residual steam remaining in the cylinder. In this way it is possible to achieve the higher efficiency characterizing the zero clearance with zero compression or Z-Z operating principle of the present invention.

Refer now to FIG. 9 illustrating a single expansion steam engine similar to FIG. 2 except that the exhaust is removed through an exhaust valve 102 in the piston head as described concerning FIG. 8 rather than through the inlet valve 28 as shown in FIG. 2. Accordingly, there is no exhaust passage 19 through the head 18 as in FIG. 1 and the valve body 28' is the same as described above in FIGS. 4, 7 and 8. Exhaust valve 102 and piston 14 are substantially as described in FIG. 8.

During operation, as the piston 14 of FIG. 9 approaches TDC, spring 103 which has a lower biasing force than that of inlet spring 29, allows exhaust valve 102 to close at or before the opening of inlet valve body 28' through a piston applied bump force during the final movement, e.g. 0.005 in. of piston 14 so as to lift the inlet valve body 28' slightly off the seat 34. Assuming supply steam at 500 psi, a lifting force typically of about 1000 lbs. is then exerted against the closure surface 34 of the inlet valve body 28' propelling the inlet valve fully open abutting the stop surface 19*a* with port 31*a* aligned over the mouth of steam passage 45. Then as the high pressure steam flows past the needle 54 at the rate selected, the pressure in chamber 47 rises until spring 29 is able to close the inlet valve body 28' thereby establishing optimum cutoff of supply steam that was set, selected or determined by an engine control as described with reference to FIG. 2. The piston then continues through the remainder of the power stroke until the cylinder pressure in chamber 16 drops to the level desired for release set by spring 103 which then opens the supplemental exhaust valve 102 and holds it open throughout substantially the entire remaining exhaust stroke as in FIG. 8. Both the cylinder head 18 and inlet valve are of less complicated construction than in FIG. 2. In addition, relatively cool low pressure exhaust steam has little opportunity to chill incoming steam. As the piston drops below the exhaust ports 64, cylinder pressure will fall to ambient and the exhaust valve 102 will open if not already open. The exhaust valve 102 then remains open during the upstroke in a second phase of the exhaust process during which residual steam flows out through exhaust valve 102 so that there is little if any compression of residual steam when the zero clearance condition is reached as the valve body 28' and the piston come into contact. The piston outer diameter is reduced as shown between the rings R at each end to form a peripheral longitudinally extending passage 107*a* communicating between the exhaust the exhaust valve 102 through six ports 109 and the outlet ports 64 in the cylinder wall carrying steam into countercurrent heat exchange relationship with four concentric coils of a steam line 111 that are nested within one another and separated by concentric circular baffles A', B and C. Steam enters the coils 111 from a condenser 112 and after being reheated flows to heater 110 such as a burner or a chamber where it is further heated by engine combustion exhaust gas before reentering the engine from the steam supply 42 in a closed circuit.

Figure 9A:
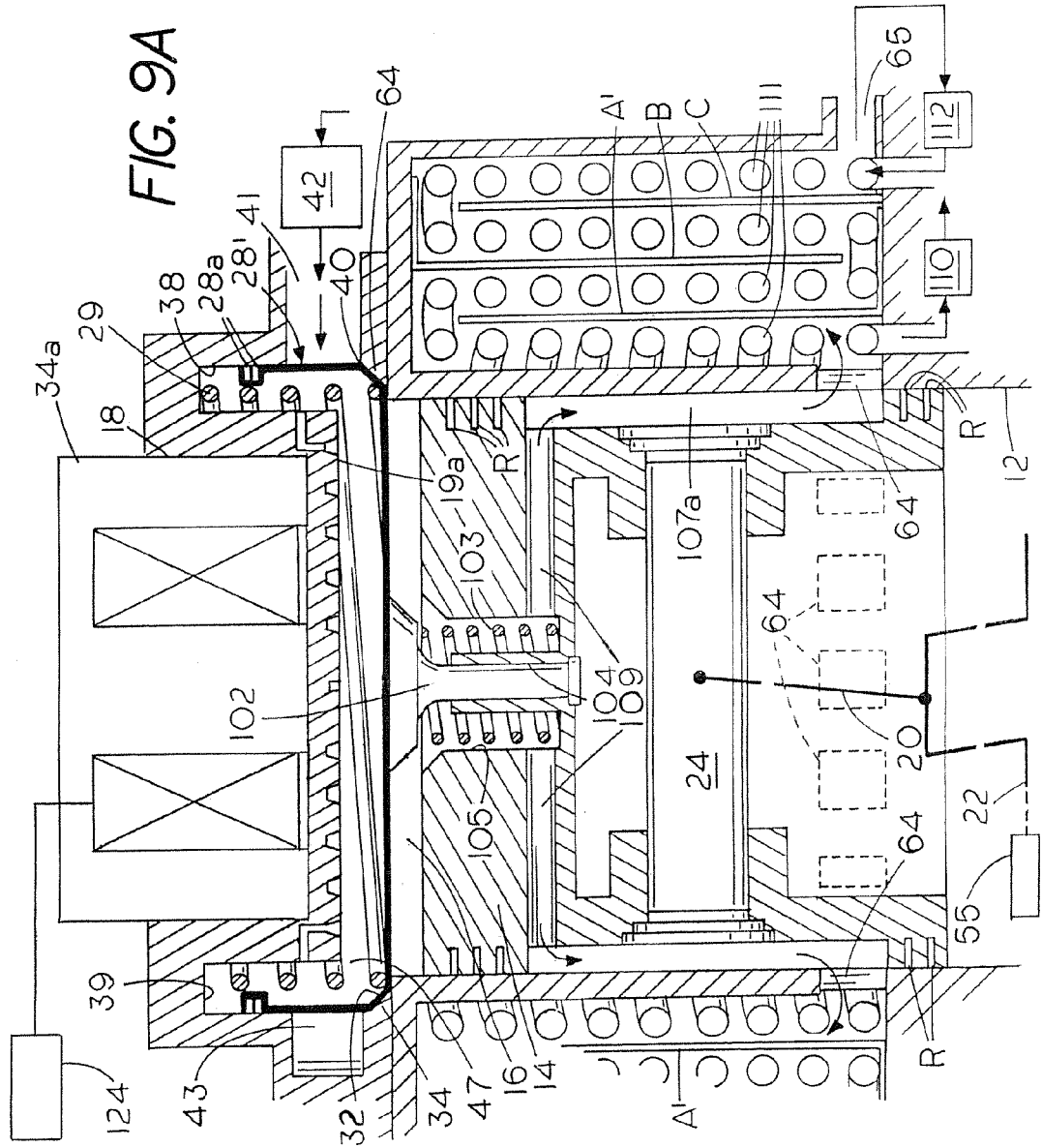
FIG. 9A is a view similar to FIG. 9 showing a modified form of inlet valve assembly as described in accordance with the invention.

Refer now to FIG. 9A wherein the same numerals refer to corresponding parts in FIG. 9 and in other figures. FIG. 9A illustrates a modified form of inlet valve assembly in accordance with the present invention as disclosed hereinabove and in our prior copending application Ser. No. 12/959,025 filed Dec. 2, 2010, which has been incorporated herein by reference. FIG. 9A is generally similar to FIG. 9 and includes an inlet valve body 28' that can be opened either automatically responsive to piston contact or in this case electrically by means of a solenoid 34*a*. The solenoid 34*a* produces an intermittent magnetic field for operating inlet valve body 28' of each cylinder with further efficiency. The electric solenoid 34*a* is mounted above inlet valve body 28' concentric within the valve timing chamber 47 so that when actuated by a suitable electrical power supply the solenoid will provide an intermittent magnetic field for opening the valve body 28' at precisely timed intervals for starting or, if desired, for running. The inlet valve 28' is thus able to be opened automatically responsive to contact by the piston 14 as in FIG. 9 or it can be operated electrically by means of the solenoid 34*a*. The electronic controller 124 (FIGS. 8 and 9A) such as an electronic engine management computer of suitable known construction is described above and is also as described in copending application Ser. No. 12/959,025 for regulating the steam cutoff as a fraction of the power stroke to optimize thermal efficiency or providing greater power as the need arises during operation. The engine controller 124 can operate continuously throughout operation to control the steam cutoff for optimizing efficiency under changing operating conditions as noted above. The engine of FIG. 9A can be started by an electric starter motor designated 55 or if desired by means of the electrical solenoid 34*a*. Solenoid 34*a* can also operate the inlet valve body 28' while the engine is running. Operation then continues as described above in connection with FIG. 9.

Terms relating to engine or cylinder orientation, such as upper, lower, top, bottom, etc. are used herein only for convenience and are not intended to limit orientation of the engine components in space.

Many variations of the present invention within the scope of the appended claims will become apparent to those skilled in the art once the principles described herein are understood.

What is claimed is:

1. An engine having a Rankine cycle steam expander therein for transmitting power to a crankshaft comprising:
   at least one engine cylinder having a cylindrical wall, a steam cylinder head and a piston slidably and sealingly mounted in the at least one engine cylinder with a steam expansion chamber having a pair of opposed ends in the at least one engine cylinder between the steam cylinder head and the piston wherein the piston is operatively connected to a crankshaft for imparting rotation to the crankshaft,
   a steam inlet valve having a valve body that is mounted in a bore in the steam cylinder head and having an end face located on at one end of the expansion chamber confronting the piston,
   wherein the valve body of the steam inlet valve is a poppet piston yieldably biased to seal a valve closure surface thereon proximate a free end thereof onto a valve seat in the engine adjacent a port that communicates between the bore in the steam cylinder head and the expansion chamber;
   at least one steam admission inlet therein communicating with the bore and with a steam supply passage such that steam from the steam supply from the passage enters the bore in the steam cylinder head through the inlet and then flow into the steam chamber through the port when the valve body is raised off the valve seat;
   a steam exhaust valve for discharging exhaust steam from the steam expansion chamber;
   wherein the valve body comprises a steam exhaust valve closer for shutting the steam exhaust valve proximate an end of each return stroke whereby steam is exhausted from the expansion chamber to thereby reduce compression of residual steam remaining in the expansion chamber;
   wherein the steam exhaust valve is constructed and arranged to be closed when the steam inlet valve is opened to prevent a loss of admission steam mass from the expansion chamber;
   wherein a surface of the piston and a confronting end face of the steam inlet valve conform to one another to minimize a clearance between the surface of the piston and the confronting surface of the expansion chamber in the at least one engine cylinder as a bump force is applied by piston motion to open the steam inlet valve,
   wherein a connecting rod between the piston and the crankshaft establishes clearance between the piston and the steam cylinder head to be at a minimum during a transition from discharging exhaust steam out of the expansion chamber to admitting steam into the expansion chamber;
   the engine being devoid of a lifter element projecting from the inlet valve or from the piston for operative interaction therebetween;
   wherein a diameter of the steam inlet valve is at least as great as or greater than a diameter of the piston such that the piston moves the inlet valve within the cylinder head when opening the inlet valve; and
   wherein as the steam inlet valve is opened the piston and the steam inlet valve are in contact with one another throughout a top of the piston to thereby reduce clearance at the end of an exhaust stroke.

2. The engine of claim 1, wherein the poppet piston of the steam inlet valve is sealingly mounted in the bore, and
   wherein when the steam inlet valve is opened, the steam passes from the steam supply passage through the steam admission inlet so as to produce an opening force on the poppet piston of the steam inlet valve to provide a steam power assist which exceeds a yieldable bias on the steam inlet valve thereby driving the steam inlet valve body to a more fully open position.

3. The engine of claim 1, wherein the steam inlet valve is yieldably biased by a spring toward the expansion chamber and onto the seat thereof;
   a rod connected between the piston and the crankshaft is constructed and arranged to slightly elevate the inlet valve off of the valve seat when the piston is at a dead center position; and
   the steam inlet valve when slightly elevated causes pressurized steam from the steam supply passage to enter a portion of the bore between the valve body and the piston that produces a steam power assist sufficient to open the steam inlet valve and compress the spring.

4. The engine of claim 1, wherein the steam exhaust valve has a steam exhaust valve opener for keeping the steam exhaust valve open proximate an end of an exhaust stroke whereby little or no work is consumed in the recompression of residual steam such that the engine is thereby indicated to operate in accordance with the formula $$\eta_{zz} = \text{Cycle Efficiency} = \frac{Work_{NET}}{m\Delta h} = \frac{P_T}{\rho_s x \Delta h}\left[\frac{xn - x^n}{n-1} - \frac{P_A}{P_T}\right].$$

5. The engine of claim 1, wherein the steam inlet valve has a sleeve valve element slideably mounted in the engine proximate the valve body of the steam inlet valve;
   wherein the sleeve valve element has an annular valve sealing surface for engagement with a second valve seat that is in series with said seat of the valve body of the steam inlet valve;
   the sleeve valve element and the valve body of the steam inlet valve are independently movable for preventing the admission of steam when both are in a seated position and for allowing admission of steam only when both are unseated; and
   the valve body of the steam inlet valve is positioned to be opened by the bump force applied thereto by piston motion and the sleeve valve element is opened and closed by having an operative relationship to crankshaft rotation.

6. The engine of claim 5, wherein the valve actuator for the sleeve valve element has a phase control for a closing timing thereof to thereby vary the cutoff of steam passing through the steam inlet valve into the expansion chamber.

7. The engine of claim 1 wherein the inlet valve has a sleeve element that is slidably mounted in the engine and
wherein the sleeve element is operatively associated with the inlet valve body.

8. The engine of claim 1 and a heat exchanger at least partly surrounding the cylinder for transferring heat from steam that is exhausted from the cylinder to water that is recycled from a condenser.

9. The engine of claim 1 further comprising an electromagnet positioned so as to produce a magnetic flux oriented in a direction to open or hold open the inlet valve.

10. A steam expander of an engine comprising:
at least one engine cylinder having a cylinder head and a working piston slideably mounted therein and operatively related to a crankshaft for imparting rotation to the crankshaft;
a steam inlet valve;
wherein the steam inlet valve further comprises an inlet valve body that is slideably mounted within a valve bore in the cylinder head of the engine;
the valve body having a valve closure surface for contact with a valve seat when moved axially in the valve bore;
said expander having a steam expansion chamber between the working piston and the valve body;
wherein the valve body has a valve face on a free end thereof that confronts the working piston for establishing face-to-face contact therewith;
wherein the steam expander has a steam supply passage for introducing steam into the steam expansion chamber when the valve body is raised off of the valve seat;
wherein the face on the free end of the valve body is located to contact the working piston throughout the area of an end of the working piston to thereby enhance a reduction of the clearance volume between the steam cylinder head and the working piston as a bump force from working piston motion moves the valve body off of the valve seat;
wherein the engine is devoid of a lifter element projecting from either the inlet valve or piston for operative interaction therebetween and
wherein a valve bore diameter for the steam inlet valve body is at least as large as a diameter of the engine piston whereby the engine piston moves the inlet valve in a direction to open the inlet valve.

11. The expander of claim 10, wherein the valve body is lifted to a more fully open position by steam passing into the at least one engine cylinder from the steam supply passage such that the valve body is raised further from the valve seat.

12. The expander of claim 10, further including a steam exhaust valve in the at least one engine cylinder that communicates with the steam expansion chamber and is constructed and arranged to remain open during exhaust strokes of the at least one engine cylinder until closure thereof proximate an end of each of the exhaust strokes such that there is reduced compression of residual steam remaining in the at least one engine cylinder at the end of each of the exhaust strokes.

13. The expander of claim 10,
wherein a diameter of the steam inlet valve is greater than a diameter of the working piston; and
wherein the valve face of the valve body of the steam inlet valve contacts the face of the working piston across the entire cross-section of the piston thereby reducing a clearance volume to zero at a top dead center position of the piston.

14. The expander of claim 10,
wherein the steam exhaust valve is located in a head of the piston,
wherein at least one peripheral steam exhaust passage extends longitudinally of the working piston, compression rings above and below the peripheral longitudinal passage and at least one port communicating between the steam exhaust valve and the exhaust passage for discharging exhaust steam through an opening in a sidewall of the at least one engine cylinder.

15. The steam expander of claim 10, further comprising
a magnetic solenoid to produce a magnetic field operatively associated with the steam inlet valve to start the engine or for operating the steam inlet valve while the engine is operating.

16. The engine of claim 10, further comprising a valve slidably and yieldably biased from within the end of the working piston to press against the inlet valve over an opening in the inlet valve.

17. An engine having a Rankine cycle steam expander therein for transmitting power to a crankshaft comprising:
at least one engine cylinder having a steam cylinder head and a working piston slidably and sealingly mounted in the at least one engine cylinder with a steam expansion chamber therein having a cylindrical side wall and two ends and the piston being operatively connected to a crankshaft for imparting rotation thereto,
a steam inlet valve having a valve body that is slidably mounted in a bore in the steam cylinder head and having a face at a free end thereof that forms all of an end of the expansion chamber confronting the working piston,
wherein the valve body of the steam inlet valve is yieldably biased by a first relatively strong biasing force to seal a valve seat in the engine that surrounds both the inlet valve face and a port that communicates between the bore and the expansion chamber,
wherein the valve body of the steam inlet valve has a sidewall positioned to reciprocate within the bore in the steam cylinder head during operating for admitting steam when moved away from the expansion chamber and off of the valve seat,
wherein the entire face of the inlet valve contacts one end of the expansion chamber defined by the working piston to enhance a reduction of engine clearance volume within the at least one engine cylinder at an end of an exhaust stroke,
wherein a steam exhaust valve that has a face on a free end thereof that forms a portion of a top of the working piston and the steam exhaust valve is yieldably urged toward an open position by a second biasing force that is less than the first biasing force,
wherein the exhaust valve is closed by contact with the face of the inlet valve,
wherein confronting surfaces associated with the working piston and the steam inlet valve come into contact with one another as piston motion applies a bump force to the steam inlet valve,
wherein the relationship between the first and second biasing forces causes the steam exhaust valve to close at or before the opening of the steam inlet valve,
wherein the steam inlet valve is at least as large in diameter as the working piston and contact between the working piston and the inlet valve produces a zero clearance throughout the cross-sectional area of the working piston as the bump force applied by working piston motion elevates the inlet valve off of the inlet valve seat, such that the working piston opens the inlet valve by imparting movement to the inlet valve, and such that clearance in the expansion chamber is reduced thereby reducing residual steam remaining in the expansion chamber as the working piston in the at least one engine cylinder reaches a dead center position between a power stroke and an exhaust stroke.

18. The engine of claim 17, wherein the steam exhaust valve is yieldably biased within a passage through the head of the piston for discharging exhaust steam from the at least one engine cylinder through the piston to a steam exhaust passage.

19. The engine of claim 18 and a heat exchanger at least partly surrounding the cylinder for transferring heat from steam that is exhausted from the cylinder to water that is recycled from a condenser.

20. The engine of claim 17,
wherein the steam inlet valve is sealingly mounted within the bore such that upon opening the steam inlet valve, steam from the steam supply passage is thereby sealed within the bore between the steam inlet valve and the expansion chamber so as to develop sufficient steam pressure therein to provide a steam power assist to further open and hold open the steam inlet valve.

21. The engine of claim 17,
wherein a valve chamber is provided in the steam cylinder head at an end of the steam inlet valve opposite the face thereof, and wherein steam flow rate from a steam supply duct into the valve chamber establishes a period of time that the steam inlet valve remains open to thereby determine a cutoff of steam supplied by the steam inlet valve to the expansion chamber during a power stroke of the at least one engine cylinder.

22. The engine of claim 17,
wherein a sleeve valve element is slidably mounted coaxially of the valve body of the steam inlet valve for engagement with a second valve seat, and wherein the sleeve valve element and the valve body of the steam inlet valve are independently movable for preventing admission of steam into the at least one engine cylinder when either the sleeve valve element or the valve body of the steam inlet valve is in a seated position; and allowing admission of steam only when both the sleeve valve element and the valve body of the steam inlet valve are unseated.

23. The engine of claim 17,
wherein the expander comprises a steam expander that is a part of an internal combustion engine wherein combustion exhaust gas is ducted to heat a heater for steam that is supplied to provide power for the steam expander.

24. The expander of claim 17,
wherein the steam exhaust valve is mounted in ahead of the working piston, wherein the exhaust steam flows from the exhaust valve through an exhaust passage as a part of the working piston and out of the at least one engine cylinder through an opening in a sidewall of the at least one engine cylinder into countercurrent flow relationship with a tube connected to a condenser to heat water passing through the tube from the condenser.

\* \* \* \* \*

UNITED STATES PATENT AND TRADEMARK OFFICE
CERTIFICATE OF CORRECTION

| | |
|---|---|
| PATENT NO. | : 9,316,130 B1 |
| APPLICATION NO. | : 13/532853 |
| DATED | : April 19, 2016 |
| INVENTOR(S) | : James V. Harmon, Sr. et al. |

It is certified that error appears in the above-identified patent and that said Letters Patent is hereby corrected as shown below:

In the Specification:
Column 11, line 65, after "body" change "2W" to --28'--.
Column 12, line 20, after "kind" and before "used" insert --47--.
Column 12, line 32, after "valve" cancel "2W" and insert --28'--.

In the Claims:
Column 20, line 52, (claim 17) after "valve" and before "has" cancel "that".
Column 22, line 24, (claim 24) after "in" cancel "ahead" and insert --a head-- as two separate words.

Signed and Sealed this
Fifth Day of July, 2016

Michelle K. Lee
*Director of the United States Patent and Trademark Office*